(12) United States Patent
Skerpac

(10) Patent No.: US 8,812,319 B2
(45) Date of Patent: Aug. 19, 2014

(54) DYNAMIC PASS PHRASE SECURITY SYSTEM (DPSS)

(75) Inventor: Valene Skerpac, Croton on Hudson, NY (US)

(73) Assignee: iBiometrics, Inc., Croton-on-Hudson, NY (US)

( * ) Notice: Subject to any disclaimer, the term of this patent is extended or adjusted under 35 U.S.C. 154(b) by 272 days.

(21) Appl. No.: 13/467,487

(22) Filed: May 9, 2012

(65) Prior Publication Data

US 2013/0132091 A1    May 23, 2013

Related U.S. Application Data

(63) Continuation-in-part of application No. 10/062,799, filed on Jan. 31, 2002.

(60) Provisional application No. 61/483,963, filed on May 9, 2011, provisional application No. 60/265,266, filed on Jan. 31, 2001.

(51) Int. Cl.
*G10L 15/00* (2013.01)
*G10L 17/24* (2013.01)
*G10L 17/14* (2013.01)

(52) U.S. Cl.
CPC .............. *G10L 17/24* (2013.01); *G10L 17/14* (2013.01)
USPC ........................................................ 704/246

(58) Field of Classification Search
CPC ................... G10L 17/24; G10L 17/14
See application file for complete search history.

(56) References Cited

U.S. PATENT DOCUMENTS

| | | | | |
|---|---|---|---|---|
| 6,272,463 B1* | 8/2001 | Lapere | ......................... | 704/248 |
| 6,978,238 B2* | 12/2005 | Wohlsen et al. | ............. | 704/246 |
| 8,442,824 B2* | 5/2013 | Aley-Raz et al. | ............. | 704/247 |
| 2002/0104027 A1* | 8/2002 | Skerpac | ....................... | 713/202 |
| 2007/0219792 A1* | 9/2007 | Normandin | ................... | 704/239 |
| 2012/0130714 A1* | 5/2012 | Zeljkovic et al. | ............. | 704/235 |
| 2012/0253809 A1* | 10/2012 | Thomas et al. | ............... | 704/246 |

OTHER PUBLICATIONS

Woo, Ram H., Alex Park, and Timothy J. Hazen. "The MIT mobile device speaker verification corpus: data collection and preliminary experiments." Speaker and Language Recognition Workshop, 2006. IEEE Odyssey 2006: The. IEEE, 2006.*
Li, Qi, and Biing-Hwang Juang. "Speaker verification using verbal information verification for automatic enrolment." Acoustics, Speech and Signal Processing, 1998. Proceedings of the 1998 IEEE International Conference on. vol. 1. IEEE, 1998.*
Li, Qi, Biing-Hwang Juang, and Chin-Hui Lee. "Automatic verbal information verification for user authentication." Speech and Audio Processing, IEEE Transactions on 8.5 (2000): 585-596.*

(Continued)

*Primary Examiner* — Brian Albertalli
(74) *Attorney, Agent, or Firm* — Dinsmore & Shohl LLP

(57) ABSTRACT

There is disclosed an n-dimensional biometric security system as well as a method of identifying and validating a user through the use of a automated random one-time passphrase generation. The use of tailored templates to generate one-time phase phrase text as well as the use of update subscriptions of templates ensures a high level of security. A verification session preferably uses short, text-independent one-time pass phrases and secure audio tokens with master audio generated from an internal text-to-speech security processor. An automated enrollment process may be implemented in an ongoing and seamless fashion with a user's interactions with the system. Various calibration and tuning techniques are also disclosed.

2 Claims, 7 Drawing Sheets

(56) References Cited

OTHER PUBLICATIONS

Siohan, Olivier, et al. "Background model design for flexible and portable speaker verification systems." Acoustics, Speech, and Signal Processing, 1999. Proceedings., 1999 IEEE International Conference on. vol. 2. IEEE, 1999.*

Subramanya, Amarnag, et al. "A generative-discriminative framework using ensemble methods for text-dependent speaker verification." Acoustics, Speech and Signal Processing, 2007. ICASSP 2007. IEEE International Conference on. vol. 4. IEEE, 2007.*

Gupta, Harsh, et al. "Field evaluation of text-dependent speaker recognition in an access control application." Proc. 10th Int. Conf. "Speech and Computer"—SPECOM'2005. 2005.*

Dong, Chengyu, et al. "Support vector machines based text dependent speaker verification using HMM supervectors." Speaker and Language Recognition Workshop (Odyssey). 2008.*

Shang, Wei, and Maryhelen Stevenson. "A playback attack detector for speaker verification systems." Communications, Control and Signal Processing, 2008. ISCCSP 2008. 3rd International Symposium on. IEEE, 2008.*

Afolabi, A. O., A. Williams, and Ogunkanmi Dotun. "Development of a text dependent speaker identification security system." Research Journal of Applied Sciences 2.6 (2007): 677-684.*

* cited by examiner

| Human Input 1 | Function Set Outcome 1 | Match Result 1 | Biometric Input 1 | Match Result 1 |
|---|---|---|---|---|
| Voice Input 1 | Phase 1 | Match result 1 | Voice Input 1 | Match Result 1 |
| ⋮ | ⋮ | ⋮ | ⋮ | ⋮ |
| Human Input n | Function Set Outcome n | Match Result n | Biometric Input n | Match Result n |
| Voice Input | Phrase n | Match Result n | Voice Input n | Match Result n |

Human Inputs are the same as simultaneous Biometric and Recognition Inputs
Functions Set Outcomes are the random generation of phrases

Figure 5

| Session Tag | Speaker Recognition Object | Speech Recognition Object |
|---|---|---|
| | - Random Phrase | - Random Phrase |

| Speaker Recognition Object User Phrase | Speech Recognition Object User Phrase |
|---|---|

Figure 6

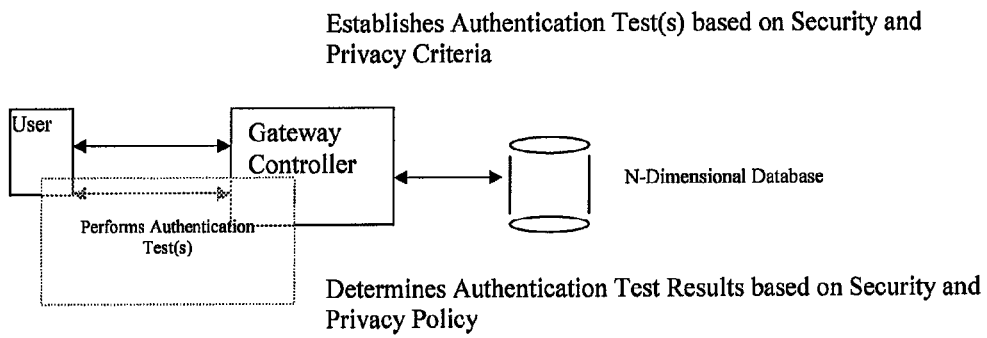

Figure 7

DYNAMIC PASS PHRASE SECURITY SYSTEM (DPSS)

This is a non-provisional continuation-in-part patent application which claims priority to both U.S. patent application Ser. No. 10/062,799, filed on Jan. 31, 2002 (Parent application) and U.S. Provisional Patent Application 61/483,963, filed on May 9, 2011 (Provisional application). The Parent application also claimed priority to Provisional Patent Application 60/265,266 filed Jan. 31, 2001. This application incorporates by reference all of the material presented in the originally filed Parent and Provisional applications, however, for purposes of examination, Applicant requests that this application be reviewed de novo and that the prosecution history of the Parent application not apply to the present application.

BACKGROUND

One of the biggest security exposures today is unauthorized user access to data, systems and networks. User authentication is a critical aspect of information systems security which is essential to the confidentiality, integrity and availability of data, systems and networks. Biometric access control security systems, that measure a user's unique physiological and behavioral traits, have been developed to provide protection by allowing authorized access only to users who pass a biometric identification or verification test. The information systems security community defines biometrics as 'something you are' that can be used as a factor of authentication for identification purposes and thereby has particular value when used as a counter measure against computer security exposures and identity fraud.

Biometrics used for security purposes measure a person's physiological and/or behavioral traits that are unique to an individual user and different from other users. The underlying methodology to perform biometric verification for security purposes, in its simplest form, is as follows. Prior to biometric verification, an authentic user's biometric model is created and stored through an enrollment process which registers the user's biometric features. To verify the identity of a claimed user, the system extracts the claimed user's biometric features during verification and matches the features to the user's biometric model on file. If the features match those of the enrolled user's biometric model, biometric verification passes. If the features do not match the enrolled user's biometric model, biometric verification does not pass.

Biometric data is subject to theft throughout the information security architecture of the biometrics system. The user's raw biometric input can be public and nefariously acquired from other sources or could be stolen at the input biometric sensor, during transmission or if stored. Similarly, the user's biometric features can be stolen at input, during transmission, or if stored. A hacker could fool a biometric security system into thinking the authentic user is present by inserting the user's stolen biometric data. This is known as a replay or spoofing attack. Though the biometric verification process may pass, the authentic 'live' user was not present and an imposter has spoofed the biometric security aspect of the authentication system. Replay or spoofing and related vulnerabilities during biometric verification provide an avenue for impostors to invoke a manual or automated method to commit identity fraud.

N Dimensional Biometric Security System

A biometrics security system in which spoofing is not viable needs to address this problem and acknowledge that raw biometrics data is public, often found on the internet today, and can be used for the purpose of spoofing. To combat spoofing, the parent application introduces the concept of an n-dimensional biometric system. This type of biometric security system is described as one in which biometric verification is tightly coupled with the human input (raw biometric data) of a 'dynamic biometric' which can vary n times where n can be so large that, through a challenge response methodology, the biometric raw input data and its associated biometric features may be calibrated to reduce repetition of a challenge response within a predefined set of parameters. A 'dynamic biometric' is defined as one that has the characteristics of being highly flexible and fluid with a cognitive and behavioral component that lends itself to an intuitive human interface. Examples of dynamic biometrics are text independent voice, hand gesture or handwriting biometrics. A dynamic biometric is unlike an iris biometric, for example, which is fixed and non-intuitive. Secondly, upon initial enrollment of an n-dimensional biometric (which does not need to exceed five minutes), there is the immediate capability to vary verification challenges to be one-time if desired. An n-dimensional biometric has no requirement for biometric input (raw training data) used during enrollment to correlate specifically with the input (raw data) used during a verification challenge.

One major benefit of biometric verification based on the n-dimensional concept is that one-time input cannot be anticipated at the time of verification and is not subject to learning attacks. The inability for an attacker to anticipate the human challenge provides for robust anti-spoofing. One implementation defined broadly in the parent application and improved upon in this continuance utilizes text independent voice biometrics whereby a one-time challenge phrase is randomly generated on-the-fly by the system, repeated by the user and the user utterance is verified by the system through a simultaneous yet independent speaker and speech recognition process. If an attacker were to collect publicly known raw biometrics data or attempt a learning attack by collecting previous challenge-response biometric raw input or features during verification, the attacker could not anticipate a one-time challenge. Additionally, if intricate knowledge of the dynamic biometric model on file were obtained by unauthorized persons, this does not mean that the individual's biometric can no longer be used (i.e., stolen) because each instance of the biometric authentication is unique and controlled by the proposed security system during a unique authentication session. That is, biometric verification is realized through biometric security tokens unique to the authentication session. This biometric security token concept is broadly introduced in the parent application using voice biometrics and is expanded upon in this continuance in detail with additional patent features.

An added benefit of an n-dimensional biometric is that a security system can incorporate an intuitive and managerial aspect to biometric authentication through user or organization control of biometric verification input. The tight coupling of a dynamic biometric with the imposed structure of the challenge response makes this possible. This user control and management concept is broadly introduced in the parent application using voice biometrics and is expanded upon in this continuance in detail with additional patent features. For example, the concept of language sets are introduced whereby a user can select to have their one-time challenge pass phrases be generated from a pre-designated subject area, such as 'sports' for their personal Google accounts and applications or 'IBM' for their work account and enterprise applications.

Limitations to Prior Biometric Systems Associated with Spoofing

Prior art biometric security systems lack in 'liveness detection' and are prone to spoofing, theft and/or related attacks.

Many biometric security implementations are one-dimensional systems that use a biometric like a tag; a system where there is one biometric associated with one person such as a fingerprint or one text dependent voice password or pass phrase. If implemented securely, one-dimensional biometric security systems can improve security greatly over password systems and are simple to use but are subject to privacy concerns, theft fears and big-brother trepidation. A one-dimensional fixed biometric system, such as one voice pass phrase, faces the problem of the stringent need to protect and keep secret the raw data and/or associated features that comprise the fixed one-dimensional biometric. This data can be stolen either from an alternate source or through sniffing of an established verification system as described previously and replayed by an imposter to fool a biometric authentication security system. Adequate protection of the fixed biometric data on a public network, such as the internet, is not realistic given the fact that biometric raw data is often public and freely attainable by would be hackers. In the case of a biometrics voice pass phrase, a hacker can sniff the verification audio or voice features input or steal audio associated with words available in digital form publicly or through automated or targeted voice phishing attacks. The stolen audio could then be replayed as input to the voice biometric process or otherwise inserted at vulnerable components. Further, in the case of a biometrics voice pass phrase and similar to the attack verification attack just described, a hacker can sniff the enrollment audio or voice features input or steal audio associated with the pass phrase words available in digital form publicly or through automated or targeted voice phishing attacks. These attacks are easily demonstrable and known to exist. These attacks are applicable if the system uses a universal voice pass phrase for all users and/or permits individual pass phrases.

In other prior art biometrics security systems, systems are completely free form with little or no structure imposed upon them during verification. For example, text independent speaker verification can be used free form where the user says anything when prompted to verify. These systems are prone to easy spoofing attacks as well since a hacker could copy a block of spoken audio of the user speaking from other sources on the internet or previous verification attempts and then replay the copied audio to fool the system.

Limitations to Prior Challenge Response Systems Associated with Spoofing

Previous biometric security systems attempt to go beyond the single biometric approach and incorporate a challenge response method as a means to provide randomness and address spoofing but are limited and therefore fail to adequately combat a rigorous spoofing attack.

One such previous challenge response approach is to randomly select from a small set (few in number) of biometrics variations like a multiple fingerprint system limited to ten fingers or a multiple text dependent voice biometric password or pass phrase system where the user has enrolled in five pass phrases. These systems are more robust than a single biometric system but are still prone to theft and replay attacks. The attacker can employ the same hacking techniques identified in the single fixed biometric system for each instance of the enrolled biometric. The barrier to spoofing is somewhat higher but easily overcome as the imposter is ready with any of the few possibilities.

Another example of a limited challenge response approach is to use a random security scheme involving voice biometrics. "*Speaker Verification Using Randomized Phrase Prompting*" by A. Higgins et al, discloses a randomized, locker-style, numeric combination. This system uses a numeric lock scheme whereby users enroll in a small set (6 to 12) of multiple words/numbers (not just single digits) using text dependent speaker verification. During verification the system interchanges combinations of the words creating a larger set of challenge pass phrases without making users directly enroll in all combinations of numbers. This approach aids somewhat in reducing the overhead of user enrollment to get a larger set of enrolled words for randomized challenges but is still prone to theft and learning attacks since biometrics data associated with the set number of words can be stolen as described previously.

Another method seeks to offer randomness while minimizing storage requirements but is still vulnerable to automated learning and subsequent spoofing attacks because each word needs to be enrolled and will be used again in the future (e.g., U.S. Pat. No. 6,094,632 (Hattori)).

There also exists a security scheme that uses speaker recognition along with verbal information verification where the user provides information, which contains private information that supposedly only he or she knows. For example, what high school did you attend? This is not as secure or private for the applications intended because the user has to supply and say aloud his or her private information, which could be overheard. Secondly, the verbal information can be information known from other sources such as social networking sites and then used as a basis for a hacker to collect user audio associated with the verbal information. An example of using personal information to confirm identification is described in U.S. Pat. No. 5,897,616, which automates a question/answer pair in a call center environment (e.g., asking the caller which college they attended).

Therefore, based on the foregoing, there is a need in the art for a more robust, security n-dimensional biometric security system.

SUMMARY

Embodiments of the Dynamic Pass Phrase Security System (individually and collectively, DPSS) can be used stand-alone or in conjunction with other factors and/or modes of authentication (e.g., middleware or a plug-in). DPSS can be used as an authentication method in identity frameworks middleware which includes single sign on and other federated identity management functions. Combining the capabilities of DPSS with other factors and/or modes of authentication is advantageous because it conveniently strengthens the security of the system with its inherent "liveness" and biometrics features not available in other methods of authentication. The dynamic generation and verification of spoken one-time pass phrases prevents spoofing while verifying a user's identity. DPSS provides a low cost, hands-free method of authentication of particular value when touch is in some way inhibited as an automated interface. Some examples are as a safety feature while checking a bank balance in an automotive environment, to allow door access while carrying packages or to authorize a transaction while completing a purchase. Multimodal interfaces of any variety of systems today and in the future can incorporate the capabilities of DPSS.

Aspects of the testing of one embodiment of this system are described in *Robust Speaker Verification Using Short Passphrases* (Amey Anil Rairkar, technical paper submitted to Graduate School, Rutgers University under direction of Professor Lawrence R. Rabiner, October 2010) (hereinafter, Rutgers Paper) as well as *Speaker Verification Performance, Text Independent* (an internal paper submitted for an NSF SBIR grant by Dr. Aaron Rosenberg, Rutgers University, February 2012) (hereinafter, 2012 Speaker Verification Paper).

DPSS provides an n-dimensional biometric security system architecture that extends the capabilities of today's biometric security systems so that concerns and fears, associated with fraudulent users, can be addressed. DPSS simultaneously yet independently uses biometric speaker recognition and speech recognition to verify that a user repeats the system generated one-time pass phrase. In this embodiment, speech verification of the pass phrase is speaker independent but for other embodiments, speech verification can be speaker dependent. In one implementation, this is based on voice architecture in a data communications environment that may be manifested in VoIP and the data channel on a smart phone or on a PC. Other embodiments may also be implemented in a cross-channel environment. Other embodiments may also be implemented locally to gain access to a local device such as a smart phone or laptop.

Speech recognition that is speaker independent is the typical speech recognition architecture a centralized telephony application would use. It uses generic language models (that can be made quite rich if the effort is put into it to support things like accents, etc.). Speech recognition that is speaker dependent involves some training of models specific to the user. This is typically done by the user reading text and is often done locally. Most mobile solutions today take a hybrid approach and can use both in an application. There is no reason the system should be constrained to use one or the other since both can perform the task of recognizing that the phrase is correct.

DPSS improves security through robustly and randomly generating one-time phrases whereby the user must pass text-independent speaker verification and speech verification tests simultaneously on one or more response utterances within a session.

In other embodiments, DPSS may further improve security and privacy through the use of language sets and an optional user challenge response method whereby the user must additionally pass verification and recognition tests simultaneously with a user selected phrase. The use of language and language sets gives the user an intuitive understanding of the biometric security system and control over his or her participation with the system. In an embodiment, identity management schemes for DPSS language set and password management are separate from the voice biometric model which is text independent. This allows for identity management without voice re-enrollment reducing efforts to manage and change one's voice identity. Secondly, abstraction of identity management tasks from biometric model management lends itself to more secure management practices of biometric models according to strict regulation policies of personal information.

In another embodiment, there is a computerized authentication method of creating one-time audio challenge-response tokens and verifying user voice identity comprising:

providing a database of a plurality of customers, a set of applications associated with each customer, and a security profile
        wherein said security profile is specified for each customer and application; and
    providing a database of a plurality of users, where each user is associated with
        one or more of said set of applications, and
        a profile comprising a set of preferences and identification data; and
    providing a database of text-independent speaker verification biometric models, associated with each user, for the purpose of voice biometric verification wherein each of said biometric models has a corresponding biometric composite model;
    providing a database of speech recognition language and acoustic models for the purpose of audio response speech verification;
    providing a database of grammar templates wherein each grammar template has 5 to 7 word set tags, wherein the words, within a given word set tag, are within the same part of speech, and
    providing a text word dictionary comprising a plurality of word set tags each associated with a number of words;
    providing a database of master audio for the purpose of prompt audio pass phrase generation;
    selecting, in response to an authentication request for a given customer application and a given user, a customer profile and a user profile based on a set of identification information received in said authentication request;
    authenticating said given customer application is authorized;
    verifying said given user exists in the database of a plurality of users;
    verifying said given user is active;
    verifying that at least one biometric model and its composite model indicate a status of enrolled;
    establishing an internal authentication session object for session control and sub-session management;
    establishing an internal sub-session associated with a single challenge-response relay;
    generating, in text form, a random pass phrase from a grammar template, within said database of grammar templates, and said text word dictionary;
    generating, in audio form, said random pass phrase from master audio data base;
    creating a prompt audio token with a unique sub-session ID;
    initiating an internal sub-session response time timer;
    storing said prompt audio token with said text and audio version of said random pass phrase in a sub-session object;
    sending said prompt audio token to said customer application via a communications system;
    playing said random pass phrase and prompting said given user to repeat said random pass phrase exactly via said communications system;
    collecting a user response audio;
    using said user response audio, creating a response audio token with said unique sub-session ID, sending said response audio token to a security controller via said communications system, said security controller receiving said response audio token, stopping said sub-session response time timer, storing said audio response in said session object;
    verifying said response audio token integrity;
    verifying said sub-session response time timer is less than a timeout parameter;
    verifying if a set of extracted speech recognition features are representative of the random pass phrase using said speech recognition language and acoustic models;
    setting a sub-session word match flag on and updating a session word match count if speech verification is positive;

setting a minimum number of phrases flag on if the session word match count is equal to or higher than a session word match parameter;

establishing a new sub-session and repeating the challenge-response relay steps, until the minimum number of phrases flag is on or a maximum number of challenge-response relays parameter is reached and an authentication session is aborted;

concatenating said user response audio from all sub-sessions with word match flag on if the minimum number of phrases flag is on into a concatenated audio;

matching a set of extracted speaker recognition features of said concatenated audio to a registered speaker biometric model of a registered user;

setting a biometric match flag on if the previous step is positive; setting a session authentication flag to positive if the minimum number of phrases flag is on and the biometric match flag is on; and sending an authentication passed result to said given customer application if said session authentication flag is positive, sending authentication failed result to said given customer application if said session authentication flag is false.

In another embodiment, the random pass phrase is generated from a set of tailored templates.

These and other objects and advantages of the invention will become more apparent from the following detailed description taken in conjunction with the accompanying drawings wherein:

A "computer readable medium" should be understood to refer to any object, substance, or combination of objects or substances capable of storing data or instructions in a form in which it can be retrieved and/or processed by a device. A "computer readable medium" should not be limited to any particular type or organization, and should be understood to include distributed and decentralized systems however they are physically or logically disposed, as well as storage objects or systems which are located in a defined and/or circumscribed physical and/or logical space.

A "computer" should be understood to refer to a general purpose computer which has been programmed as a special purpose computer to perform one or more logical and/or physical operations on data to produce a result.

A "grammar" should be understood to be a phrase structure which may be designated by part-of-speech (POS) tags.

A "tailored grammar" includes both generic and customized POS tags.

A "hidden dictionary" should be understood to be private and contain words that are not publically shared until such words are utilized within a prompt of a one-time phase phrase. It is different than a "secret dictionary" which contains words that are never shared publically.

A "pass phrase" should be understood to comprise the embodiments delineated in this application; however, it is not a question/answer pair as described in U.S. Pat. No. 5,897,616.

A "one-time challenge pass phrase" should be understood to comprise any of the embodiments of such delineated in this application; additionally, such a pass phrase will have the added security benefit of being generated and utilized according to a desired calibration (e.g., from only once in the entire lifecycle of the system to within a given percentage of acceptable duplication).

A "tailored template" should be understood to refer to the full manifestation of a tailored grammar which includes all word combinations for each tailored Part of Speech tag associated with a word set tag within the tailored grammar. A typical tailored grammar's template, in this embodiment, potentially yields 50K to 70K randomly generated phrases.

A "plug-in application" should be understood to refer to a program that can be easily installed and used as part of another computer system and is recognized and integrated into said computer system (e.g., a security plug-in to an application for accessing human resources data).

"Middleware" should be understood to refer to any number of general purpose computer(s) programmed to "glue together" or mediate between two separate and often already existing programs.

"Authentication" refers to the process of determining whether someone or something is, in fact, who or what it is declared to be.

"Communications system" refers to a system which permits the exchange of information over either significant distances, across multiple devices, or even within components in an embedded device by electronic means, including but not limited to, exchange via a network such as the Internet, a local area network (LAN), wide-area networks (WANs), telephone networks and wherein the communication may occur between a transmitter and receiver using a variety of protocols/electronic means including but not limited to VoIP, POTS (plain old telephone system), cellular and more.

In one embodiment, there is disclosed an n-dimensional biometric security system comprising a computer programmed to generate a one-time challenge pass phrase from a plurality of words wherein said plurality of words have each been coded with at least one part-of-speech tag and said challenge phrase conforms to a template. In a variation, the template is chosen from a group of possible tailored templates. In another variation, an error routine confirms that said challenge pass phrase is not repeated in a second authentication instance. In another variation, a second challenge phrase has a high likelihood of having a grammatically different pattern from a prior challenge phrase through the random selection of one of said templates. In another variation, the templates may be updated via a subscription. In another variation, the group includes a template following the form of a 5-7 word declarative sentence that is grammatically and semantically correct. A preferred embodiment will utilize a short challenge pass phrase that sounds innocuous enough to the casual listener (or eavesdropper) that it does not readily identify itself as a security measure. The challenge pass phase should be both grammatically and semantically correct. In another variation, DPSS includes a time-out parameter.

Another embodiment of DPSS includes an n-dimensional biometric security system comprising a computer programmed to generate a challenge phrase from a plurality of words wherein said plurality is populated with words from a hidden dictionary. In a variation, the enrollment phase collects biometrics voice characteristics from a set of user interactions. The user enrollment interactions may be either read speech and/or conversational speech. It may be gathered from background media disposed in a set of interactions comprising conversation within a call center, voice messaging audio, audio from video chat, audio from collaboration conference or other application.

In another embodiment, there is an n-dimensional biometric security system comprising a computer programmed to generate a one-time challenge phrase from a plurality of words and grammar tailored templates wherein said plurality is populated with words which are part of a hidden dictionary whereby the templates and dictionary can be updated via a subscription mechanism to ensure one-time pass phrase requirement. Said computer securely relays one-time text pass phrase, an audio version is generated and said computer provides the one-time pass phrase to a user with a spoken prompt for said challenge phrase. In a variation, the spoken prompt is internally generated by said security system which utilizes additional security features to detect and/or prevent playback attacks.

In another embodiment, there is an n-dimensional biometric security process comprising the steps of randomly selecting a template from a set of, at least, 1000 tailored templates which represents a set of grammatical rules to be used for the generation of a challenge pass phrase; randomly selecting a word(s) from a dictionary, comprising a plurality of words wherein said dictionary is populated with words which are part of a hidden dictionary, for each part-of-speech tag in said tailored template; creating a Prompt Audio Token to be referenced by an application to prompt a user to repeat said challenge pass phrase wherein both said challenge pass phrase and said Prompt Audio Token are constructed internally. The Prompt Audio Token may also be constructed using a voice talent.

It should be understood that the descriptions above are intended to be illustrative only of potential implementations of the teachings of this disclosure. Other implementations of the teachings of this disclosure, including in the forms of methods, systems, apparatuses or alternate computer readable media could be created by those of ordinary skill in the art without undue experimentation. Accordingly, the discussion above should not be treated as limiting on claims included in this application or any related applications.

BRIEF DESCRIPTION OF THE DRAWINGS

The drawings and detailed description which follow are intended to be merely illustrative and are not intended to limit the scope of the invention as set forth in any claims included in this application or in any applications claiming the benefit of this application. The reference numbers are unique to each figure although the same reference number might be used in different figures to refer to different components. Both the figure and the reference number are indicated in the Detailed Description when necessary for purposes of clarity.

FIG. 5 represents a model of the n-dimensional biometrics access control system using speech.

FIG. 6 illustrates an embodiment where a record, prior to matching, has a unique date/time identifier and hash of the entire record (session tag) embedded in each object.

FIG. 7 illustrates a schematic view of the n-dimensional biometrics access control system.

DETAILED DESCRIPTION OF EMBODIMENTS

Figure 1:
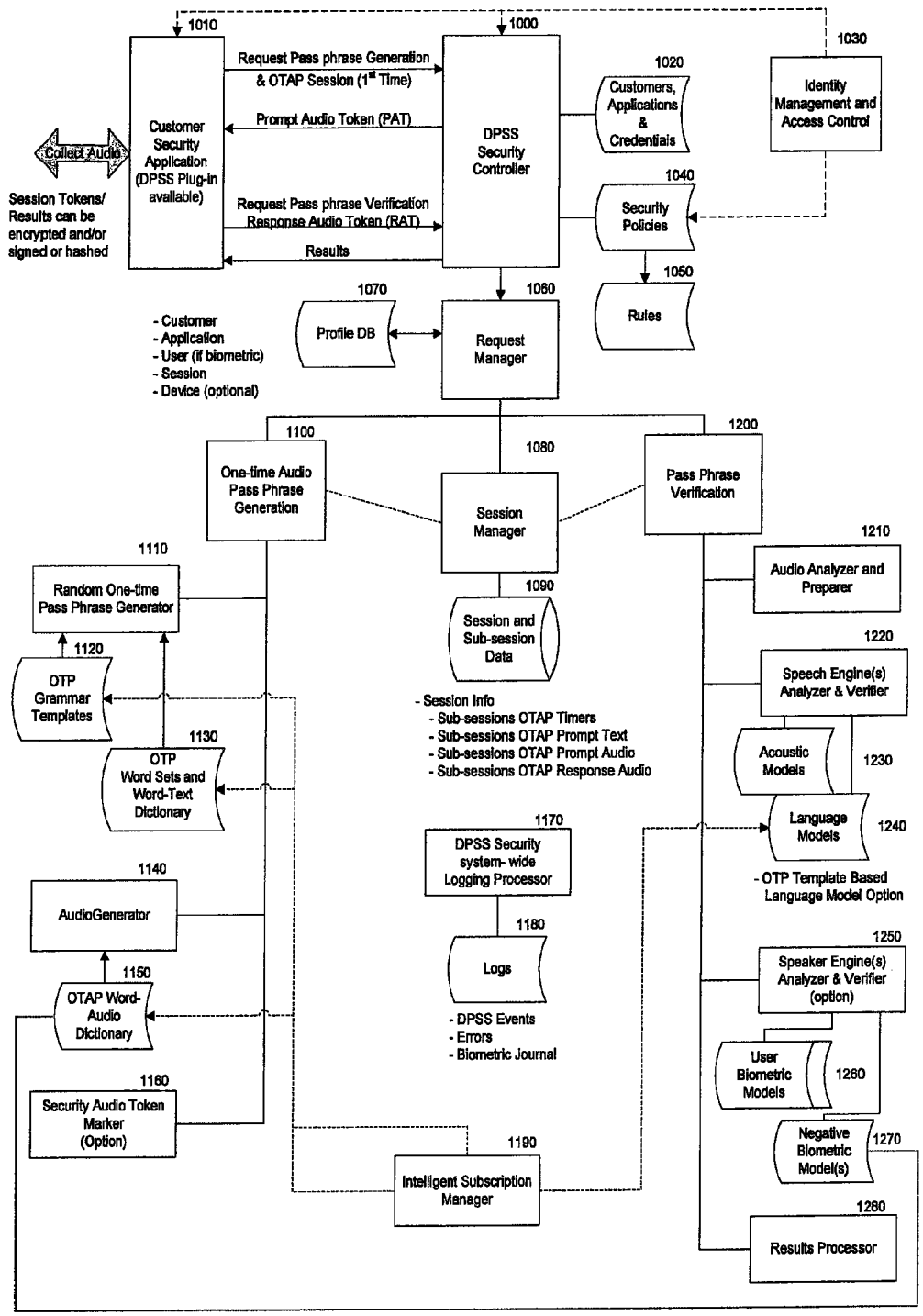
FIG. 1 provides an illustration of an embodiment of the DPSS verification system.

Embodiments of the invention comprise, at least, the following improvements to the prior art. First, use of tailored templates to generate pass phrase text. One embodiment adds the use of an update subscription of templates and hidden word dictionary and audio words to ensure a one-time pass phrase requirement. A second is the improvement of the verification session to use multiple short pass phrases in one verification session and security audio tokens which utilize master audio generated from an internal text-to-speech security processor for challenge prompts. The third is the text independent biometric enrollment process that can be automated using a variety of audio input with assurance and integrity because a Biometric Composite Model (BCM) that describes the exact make-up of each biometric model is constructed, securely stored and available to authorized security administration and management personnel. The fourth is the text independent biometric calibration process that can be automated with assurance and integrity using the Biometric Composite Model (BCM). The improvements can apply to the optional user specified pass phrase which is additional to the primary one-time pass phrase authentication.

Briefly, embodiments of the invention provide an n-dimensional biometric security system as well as a method of identifying and validating a user.

Embodiments of the system and method provide a simple technique for identifying a person, for example, a user attempting to gain access to a bank account at an ATM or over the internet, a user attempting to gain access through a door or passageway to a secured area, a user attempting to gain access to a system via a telephone or the like, a user approving a transaction.

Processes utilized in various embodiments of the invention should be able to be run in various places to accommodate multiple system and network architectures or configurations. For instance, they may run at a local intelligent machine or device. In another embodiment, the system may run centrally (in the cloud) with the end device, as one element in a telecommunications system, mainly for audio input and output (e.g. plain phone or cellular call to call center/VoIP on data channel end-to-end). In other embodiments many processes run centrally with the intelligent device performing some speech processes such as feature extractions. Other variations, amenable to those of ordinary skill in the art, should also be possible. Depending on the configuration and security requirements, some aspects of the invention are optional.

Embodiments of the proposed n-dimensional biometric security system enable a user to establish a biometric identity for a certain period of time to allay fears and provide a powerful tool for organizations and users to address security and privacy issues for voice processing systems. The following describes an example security architecture and applies it to an example system implementation architecture that utilizes the power of a master processor for security and database functions, the quality of voice processors at intelligent remote unit sites such as desktop, hand held device, mobile phone, voice over IP phone (VoIP) and/or their associated local servers/PBXs and the most appropriate encryption and/or signature-hash method(s).

Examples of the n-dimensional security system provide for security and privacy as agreed to by the user. Examples of potential uses of the system are an internet application service, which performs network and application authentication services across multi-media platforms for access to many applications such as email, messaging, and others. Remote users in a speaking environment could include speaker verification for internet application authentication from different devices intelligently consolidated and controlled by the n-dimensional system proposed.

A further example is that of a specialized application where the user wishes to view his or her private data that resides in an application hosted by an Application Service Provider (ASP). At some point in time, the user may want to move his or her private information to another application provider. An n-dimensional system allows the user to be deleted from the "History language set" at their previous ASP and enrolled in the "Art language set" at their new ASP. A second example is that of a consultant who is temporarily working with an organization and needs access to corporate systems. The organization would like to remove the consultant from the system upon contract termination and likewise, the consultant wants to be assured that the biometric is no longer useful.

In one embodiment, the sample voice system described herein uses at least 1,000 random phrase structures or tailored grammars in each language set and that each language set has the same specifications and characteristics but their own tailored grammars. A subscription mechanism can be used to update grammars and dictionary words to ensure templates that generate either one-time pass phrases or pass phrases within a predetermined degree of acceptable duplication.

An embodiment of an n-dimensional biometric security system comprises a station for receiving input information from a user representative of the user and generating a responsive signal thereto; a first data base having a plurality of words and language rules for generating challenge phrases corresponding to the user profile and a session access request therein; a second data base having biometric models of the users therein; and a controller communicating with the station to receive and validate the signal as representative of the user. The controller also communicates with the first data base for delivering a randomly generated challenge phrase at the station for the user to speak in response to validation of said signal. The controller further communicates with the station to receive and validate a spoken response to the selected challenge phrase as representative of the user.

The method of identifying and validating a user comprising the steps of having a user initially input information representative of the user at a station; generating a signal responsive to the information; receiving and validating the signal as representative of the user; thereafter delivering a randomly generated challenge phrase at the station for the user to speak in response to validation of the signal; having the user speak the randomly generated challenge phrase and generating a second signal representative of the spoken response to the challenge phrase; and thereafter receiving and validating the second signal as representative of the user.

Protection from unauthorized users has brought forth the development of biometric security systems but users are cautious due to fears associated with biometrics. Contrary to current thinking, biometric security systems that use dynamic biometrics, i.e., ones that can more easily vary such as voice, have the potential to be highly secure and private through an n-dimensional security scheme architecture, which tightly couples such a biometric with human input. Implementation of the examples disclosed herein include past, current, and future developments in speaker recognition technology and real-time natural language processing and architectural implementations, whether they have a centralized or distributed configuration. Any of the processes (input, quality assessment, feature extraction, etc.) can be performed anywhere depending on the overall system architecture.

Embodiments of the proposed security scheme improve security over past methods through a system challenge response method of randomly generated phrases. Each time the user is authenticated, a biometric audio token is created for the user based on the randomly generated phrase. Upon access, a distinct and random biometric tied uniquely to the user provides the basis for a highly secure system. This prevents an unauthorized user from utilizing the traditional hacking techniques of cracking, stealing information and system penetration with access information at another time. As described in the background information, recording or theft of voice samples or properties do not help a hacker because it would be highly unlikely to reconstruct the random phrase on the fly given the short period of time for which the user and user terminal must respond.

The proposed n-dimensional security scheme improves privacy in several ways. In the proposed voice biometrics implementation, one way to offer a user control and privacy is through the personal choice of a user phrase selection. This option needs to be used in addition to the pass phrase verification if anti-spoofing is a security requirement. The user selected pass phrase option, gives the user some control over the biometric authentication process with the option of changing their own phrase or phrases at some future point in time through an identity system without needing to re-enroll in the voice biometric.

A second way in which the proposed n-dimensional security scheme improves privacy is through the use of language sets. Language sets are subsets that apply to the same rules and knowledge of the overall language but encompass a subject area that gives the user an intuitive understanding of the system and some control over his or her participation with the system. Because the phrases are generated within a language set there must be enough variation of words, types of words and types of phrase structures to generate the kind of randomness and security required. Language sets give the user and the organization the option of moving users to a different language set(s) or deleting them from a language set via the identity management component of the system. It is likely that a user will remember having been in the "Fashion" or "Sports" language set many years down the road since it is so intuitive.

Language sets are also a good tool for organizations to implement controls associated with their policies improving overall security. Randomly generated pass phrases reduce the on-going overhead experienced by organizations associated with passwords and password resets that users find non-intuitive and difficult to manage. Random generation of a pass phrase of an n-dimensional biometric security system significantly reduces exposure to unauthorized access even if the biometric information were available. If the user or organization believes the biometric information has been compromised or damaged they can change language sets and/or re-enroll. Such techniques alleviate fears of theft and reduce privacy concerns and trepidation over big brother (or a like) controls associated with biometrics.

Embodiments of the system may be implemented in landline, cellular audio, and voice over data channels (e.g., VoIP), as well as other voice architectures (now known or developed in the future). Embodiments of the system can be implemented in multiple system and network architectures as described previously and take advantage of high quality audio processing from improved (future) handsets, high definition audio encoding and the like.

As stated in the Parent application, embodiments of the n-dimensional biometric system combine speaker and speech recognition technologies a new way during verification. For example, an authentication request is initiated when an application requests authentication as part of a business work flow or a user requests access to their personal data. The system controller challenges him to speak a randomly generated pass phrase and secondly prompts him for a user-determined phrase if he so desires. In a preferred embodiment, the authentication process obtains quality speech input, performs high quality secure signal processing and creates the representative digital forms of both the voice information used for speaker recognition and voice information used for speech recognition for each phrase. In one embodiment, the input information is processed in memory at the remote or local unit, combined into one date and time stamped record, encrypted and, optionally, digitally signed prior to communication with the controller assuming the controller is resident on another machine. The controller verifies the optional signature and decrypts the information in memory and matches against information stored in the n-dimensional database. Authentication is considered successful if both matching results are successful.

Layered security techniques at the remote or local unit are used as needed to insure the integrity of the voice input, any voice pre-processing, signal processing and security client, if present, handling session and challenge response tokens (e.g., methods to flush memory buffers of latent information upon successful as well as error processes, techniques to validate input channels to insure the reliability of the input source, communication security techniques of encryption securely designed and implemented with strong algorithms, key management, network protocols, trusted routing and error processing among others). Specific key creation schemes could be directly tied to the random generator described herein (one of skill in the art would be capable of creating such schemes). Security techniques that provide encryption and non-repudiation are implemented securely using established techniques. Similarly, layered security techniques at the controller are used to insure the integrity, confidentiality and reliability of the security controller and biometric engine, biometric models, audio files, policies and procedures and other identity and rules related database(s) to prevent exposures to the databases, buffers, system resources and availability, and the like.

Simultaneous Verification and Recognition

DPSS uses dynamic biometrics (i.e., biometrics input that can vary) to implement an n-dimensional biometric security system. In an embodiment, to obtain n-dimensional security, DPSS establishes a unique biometric identifier further described as an audio response token in this continuance, by obtaining biometric input that is simultaneous to a prescribed human input by the same user.

DPSS envisions a dynamic biometrics security system whereby the n-dimensional concept using voice processing is modeled, Human Input N and Biometric Input N are simultaneous (i.e. one utterance for both speech recognition and speaker recognition). In an embodiment, both match results must independently be positive to authenticate the user positively.

FIG. 5 from the Parent application represents an abstract model of the n-dimensional idea at the concept level. It is the union of Human and Biometric recognition processes of a challenge generated from the function versus either performed separately that is the essence of the model and the basis for the benefits of an n dimensional model. DPSS uses this abstract model as a basis for a voice biometric embodiment whereby a hacker would have great difficulty recreating one of the possible phrases on the fly as the response to the one-time pass phrase challenge generated by the function and thereby fool the system.

DPSS' authentication process creates the representative digital forms of both the voice information used for speaker recognition and voice information used for speech recognition for each phrase. Such speech representations are generated by the feature extraction algorithms and processing of the biometric (speaker verification) processor and natural language (speech verification) processor. Speaker authentication algorithms and processing are essentially one-way processes and therefore it is very difficult to reconstruct the speech input.

In an embodiment illustrated by FIG. 6, once the user requests access, the controller establishes a unique session tag to keep track of the session including a session time out limit. Once the simultaneous input, signal processing and independent speaker and speech recognition feature extraction and/or compression are complete for that distinct session, the information is processed simultaneously in memory. To insure all objects are bound together, the unique session ID and other binding information such as date/time stamp are maintained for each object. Optionally, to insure that the objects have not been altered or damaged, a hash of the objects are utilized.

Phrases and Language Sets

Phrases and Language sets focus on the word or voice recognition aspects of the proposed solution. One can view the scientific study of human language, linguistics, as consisting of phonetics or the physical nature of speech, phonology or the use of sounds in language, morphology or word formation, syntax or sentence structure and semantics or the meaning of words and how they combine into sentences. Using each area of study one can construct language in written or verbal form whereby the language exists within a language set and meets security and usability requirements. There can be many more combinations and uses of linguistics, sounds, visuals or other human interface aspects to obtain higher levels of security should that be desired in the future.

In an embodiment, the user requests system access and the n-dimensional biometric system controller responds with a challenge phrase. The controller determines a phrase and requests that the user speak it. Model generation and simultaneous matching as described previously is performed for both phrases. Controller determined phrase(s) allow for management of phrases by the intelligent controller to satisfy security and privacy requirements. Secondly, a user can also be requested to speak a phrase determined by the user. User determined phrase(s) allow management of phrases by the user to satisfy privacy and control requirements without needing to voice re-enroll for a different phrase.

A language set provides an intuitive set of phrases that link to a subject area known to the user but that still provides for enough linguistic variation to achieve the required variation in phonemes to meet the security criteria. Each controller generated phrase is a one-time random pass phrase that makes sense, constitutes a sample with good verification data, is simple to say, and avoids inappropriate phrases.

The system generates phrases by applying the rules and knowledge of language to a database of words associated with language sets. Language sets should maintain a unique subset of words specific to the intuitive subject area but various language sets overlap i.e. sets are non-exclusive.

DPSS should vary controller determined phrase requests and randomly determine a pass phrase each time it authenticates a user for security purposes. Upon a fail or any other non-completion, DPSS will randomly determine a new pass phrase and not repeat the last pass phrase. In a preferred embodiment, phrases are randomly generated from one to the next with no repetition of pattern. Such variance of phrases increases security because an imposter cannot anticipate random phrases.

Language sets provide a means for security and privacy identity management of users and groups of users. For example, an organization or department can allow only one language set unique to that organization and then, if required, switch to another language set for control purposes. Or a user may elect to change their private phrases, not allow certain phrases/word or change language subsets should they believe their voice information has been compromised. Likewise an organization using the controller intelligence can disallow language sets, phrases and words for a user or group of users should there be a suspicion of theft or compromise.

These speech techniques demonstrate how users can intuitively control the use of their biometric for security purposes. Such techniques are far more flexible and intuitive than any available with a one-dimensional biometrics system such as a fingerprint. Contrary to conventional thinking, users will be relieved that their biometric can be tailored giving them the same control and freedom they have today to change their front door lock.

Voice Architectural Implementation

The security scheme described above can be implemented across multiple systems and networks using voice systems such as digital cellular phones, Smart Phones, Tablets, Personal Digital Assistants (PDAs) and voice over Internet Protocol (VoIP) telephone systems and applications such as multi-media or voice portals on the Internet. The scheme is particularly effective and applicable today in a speech communications environment where high quality voice processing is prevalent; for example, a Personal Computer (PC) running voice recognition software with a sound card and noise canceling microphone headset installed or a well packaged smartphone device such as Apple's SIRI using high definition Voice over IP to communicate on the internet.

In one embodiment described in the parent application, there is a proposed network implementation of the voice security system is based on a Security System for Speech Communications architecture, which utilizes the power and control of a master processor for security and database functions, the quality of voice processors at intelligent remote units such as desktop and the most appropriate encryption method(s). This embodiment includes a method to secure communication between a host computer at a host location such as an ISP and at least one terminal/device at a remote location, said method comprising the steps of generating a digital signal at said remote location corresponding to an orally generated speech pattern of a prospective user; storing said digital signal in a first memory device; compressing said signal to a compressed signal, optionally digitally signing said compressed signal; encrypting said compressed signal; receiving said encrypted compressed signal at said host location; optionally verifying digital signature of compressed signal; decrypting said encrypted compressed signal at said host location to form a usable compressed signal; comparing said usable compressed signal with said stored signal at said host location to permit access to the host computer in response to said usable compressed signal matching with said stored signal. The example architecture accommodates multiple methods of sending and receiving authentication information such as methods of streaming in a VoIP environment, etc.

Authentication begins upon remote user request whereby the user had made a claim of identity that represents who they are. The claim information could be through a keyboard input of an identifying number or PIN, speech input of PIN or other identification information such as an account number, identification of the cell phone ID provided by cell phone provider or any other method such as a device ID or SIM card that facilitates the users initial claim as to who they are. Said claim information could be digitally signed and/or encrypted. The main controller validates initial user claim information and performs random generation of a one-time challenge phrase as described herein and optionally associated encryption and/or digital signature keys to be used to protect authentication information described herein across the network. A user can also be requested to speak a phrase determined by the user.

As shown in FIG. 7, one proposed security system comprises at least one user terminal and a controller gateway function, which determines access, based on matching results. The gateway performs management and control functions associated with matching or recognition, enrollment, random phrases, language sets, database security and encryption. Such a controller could be associated with single sign on and other identity systems to further the power and reach of voice authentication.

The main controller has the resources to perform such tasks as specifying required security levels and balancing of both verification and recognition modeling and matching to obtain the desired accuracy levels. The n-dimensional system can interface with other security technologies such as single sign on systems and identity frameworks or others that make sense to bundle depending on application and security needs.

Quality Voice Processing

During enrollment and speaker or speech recognition, it is preferable that the speaker and speech' recognizer consist of a high quality acoustic channel and speaker decoder so that voice processing meets satisfactory accuracy rate requirements of today's world. In an embodiment, during verification there is quality voice input, secure signal processing, feature extraction and matching whereby each function is essential and intrinsically linked for good performance end to end. One should not assume based on prior designs that all voice processing must be done either all at a desktop or all over-the-telephone line from any phone because any component of voice processing can be done anywhere between the user and controller as long as the desired results are obtained. In one embodiment, the implementation architecture processes voice input, signal processing, pre-processing performs compression and/or other required voice processing at the user terminal and matches at the controller. Voice pre-processing and biometric modeling can be performed at the remote terminal or at the central controller.

A good deal of sound and speech technology is oriented toward telephone speech and widely used telephone systems. Thus, voice processing often assumes a narrow bandwidth and noisy channel prevalent in telephone speech. A voice verification system that performs a voice test from any telephone handset over any telephone line is greatly different from a voice verification system where a voice test from a PC via a microphone making use of CD quality sound processing. Any telephone connected to the telephone system is widely available but a more intelligent device such as a PC system, PDA or intelligent phone has the capability of processing voice more accurately as we already understand from many years of use with voice recognition technology, for example, large vocabulary speech to text applications that are performed solely at the desktop with a headset and not over a cellular telephone connection. For example, a standard PC sound card or motherboard sound samples voice input at CD quality (a rate of 44 kilohertz) or better. Sound is transmitted as input through 2 channels that carry 16 bits or 2 byte words per channel, for a total of 4 bytes. Therefore the CD rate of 44,000 samples per second utilizing 4 byte resolution and assuming linear coding of the data represents 1 megabyte of voice data per 6 seconds. PC Pentium processors can easily support statistical algorithms that handle up to 1 megabyte of data. This potential capability is greater than the normal processing for telephone speech, however, which samples at 8 kilohertz and uses 8 bits data with logarithmic scaling that represents less than 48 k of voice data per 6 seconds, Improvements to sound quality and processing capabilities are also deemed to be within the scope of the technology claimed herein.

In an embodiment, a speech recognition/validation security system and method allows a user (or an automatic feature of the user's device) to initially input information representative of the user at a station, generate and validate a responsive signal representative of the user. The user claim of identity can be input manually or automatically and in any modality such as a text or spoken input of a registered account number, use of device embedded ID, use of ANI (automated number identifier)/caller ID telephone number, alternate biometric, etc. Thereafter, a randomly generated one-time challenge phrase is heard at the station for the user to speak in response to validation of generated signal. The user then speaks the challenge phrase and generates a second signal representative of the spoken response to the challenge phrase. This second signal is then processed for determining what was actually spoken as well as for the voice biometric characteristics of the speaking voice. If a match is made for the two parameters, identification and validation of the user is complete and access is given. Generating a challenge phrase in a randomly generated manner reduces the possibility of an intruder impersonating the voice of a true user.

Embodiments of the invention comprise an accurate, natural and convenient (n-dimensional) voice authentication system for a user to respond to a challenge; in general, the user will repeat one or more challenge pass phrases and, from that input, their identity will be confirmed using speech and speaker recognition simultaneously.

Figure 3:
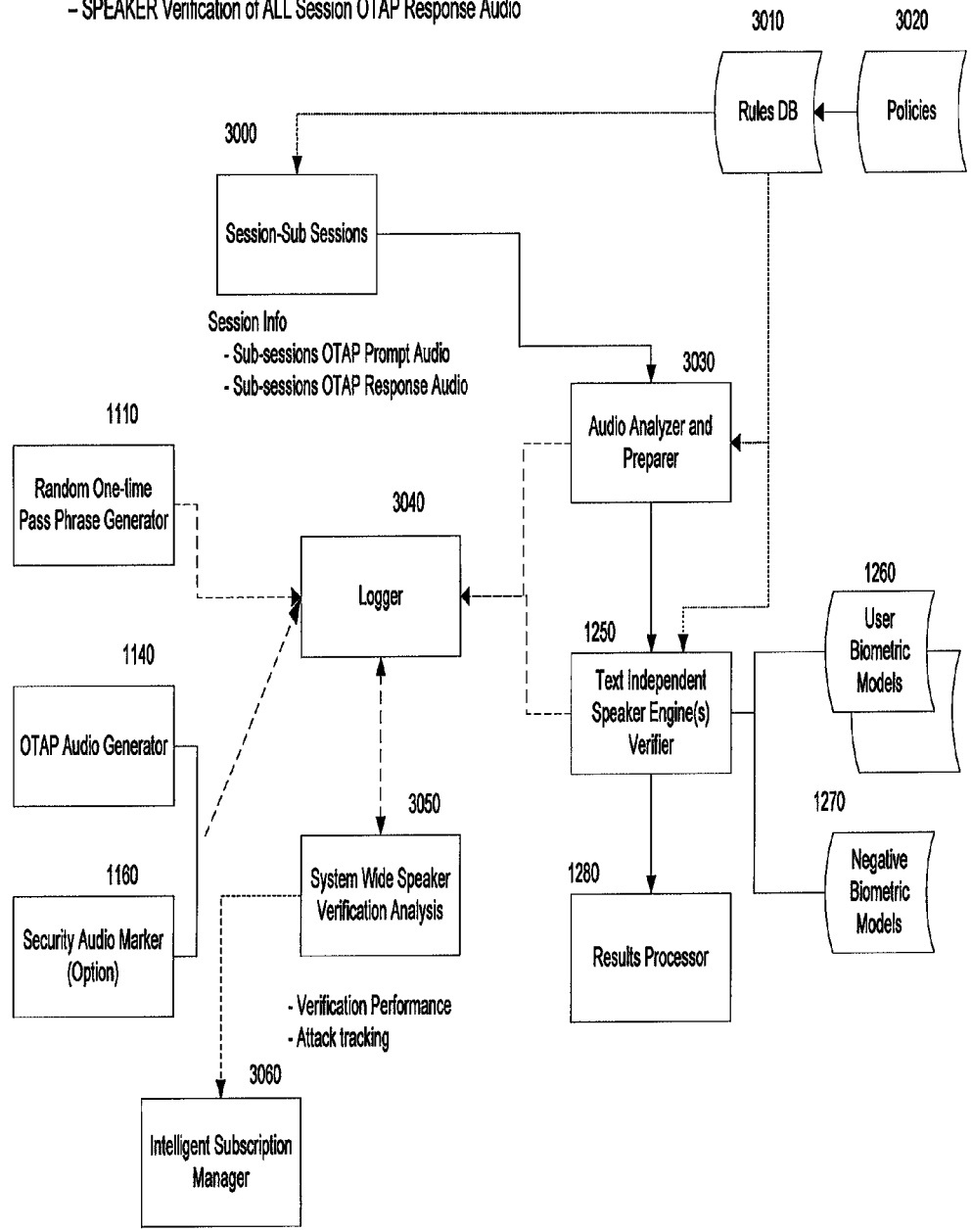
FIG. 3 provides another illustration of an embodiment of DPSS.

At a high level, the dynamic pass phrase security system is designed to combine audio from multiple short phrase utterances during authentication that can be concatenated to have a large enough audio sample to perform voice authentication at a prescribed level of accuracy. FIG. 3 depicts an embodiment in which the session function (3000) securely maintains the audio to be concatenated and used as input to speaker verification. In FIG. 3, the rules (3010) dictate verification processes as per the policies (3020) that specify the prescribed level of accuracy. Phrases should be short and easy to repeat by the users (e.g., a preferred embodiment may have 5-7 words although variations on the length of the phrase are well within the scope of the invention). The generator expands the vocabulary to provide greater randomness and further insulate the system against learning attacks. Furthermore, the system may include an error routine to ensure that the same passphrase is not duplicated.

Figure 2:
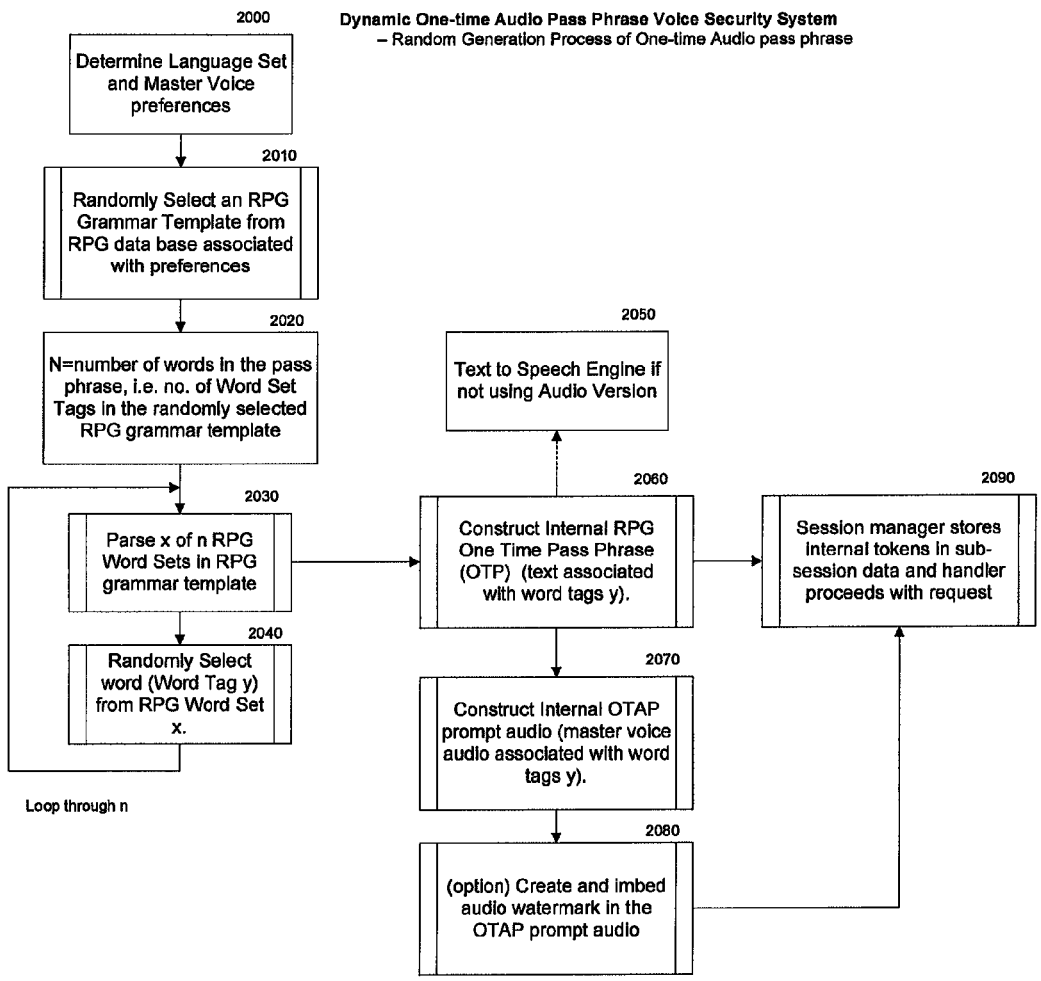
FIG. 2 provides an illustration of an embodiment of DPSS focusing on the generation of the one-time pass phrase and construction of an audio token using the DPSS internal secure text-to-speech processor.

The passphrase itself may be constructed through part-of-speech (POS) tagging as well as other methodologies known in the art of speech technology. In embodiments utilizing POS tagging, the system may generate on the fly, a semantically correct phrase for verification purposes. The system includes a number of grammar rules and/or tailored templates that incorporate POS tags within the grammar. In other embodiments of this invention, the use of tailored templates adds to standardized POS tagging by enabling the system to generate better phrases that make sense, sound good, are appropriate and vary from one sample to the next (high entropy). Referring to FIG. 2, in an embodiment, there are a total of sixty-eight possible templates to choose (2010) from with a dictionary of approximately 850 words which yield approximately 5 million potential one-time pass phrases. Entropy can be determined for the system by calculating the perplexity of a system-wide language model representative of all potential pass phrases that can be generated. Perplexity is a long-established method to determine entropy. In this embodiment, each template has a language model associated with it that has a low perplexity maximizing the speech recognition result. The system-wide language model for a production environment has a high perplexity which significantly reduces successful hacking attacks. The ability to hack successfully becomes negligible as system-wide perplexity increases. This is a function of both the number of potential pass phrases generated and that the pass phrases are grammatically different. In this way, the random generator is different and far more effective than a numeric approach where the grammar is limited. In other embodiments, a subscription ability may allow the addition, updates and deletions of templates which further adds to the system's functionality and ability to maintain high perplexity. In some embodiments, the chance of duplication for a pass phrase may be statistically zero (although no repetition may be additionally enforced by running a check of the generated phrase against pass phrases generated by the system). In other embodiments, the system may be calibrated to allow duplication of pass phrases within a certain margin or that margin may be defined by a given user. Experimental testing conducted with the 68 templates resulted in a very high authentication rate per the Rutgers Paper.

In other embodiments of this invention with large centralized controllers as shown in FIG. 1, there may be a much higher number of templates than 68 available in a one-time pass phrase (OTP) generation grammar template data base (1120) and dictionary data base (1130). Additionally, the large centralized controllers can use the intelligent subscription (1190) capability to update templates securely and with integrity. On the other hand, in a smart phone embodiment with on board one-time pass phrase random generation, the remote subscription capability to update templates securely provides the added flexibility needed to ensure continual one-time pass phrases that meet the usability, security and privacy requirements of the system.

Embodiments utilizing a subscription negate the possibility that hackers will succeed in a learning attack since they can continually update with integrity as needed.

With regard to the text independent enrollment aspect of the system, a different type of speech may be used for biometric enrollment versus the type of speech used for biometric verification. In prior art systems, it was considered suboptimal to utilize dissimilar types of speech (e.g., conversational speech, as in between a customer and a call center agent, for enrollment versus a short pass phrase, as in between a customer and a call center IVR self service application, for verification) and still achieve adequate performance. Research experiments detailed in the Rutgers paper demonstrate accurate text independent verification of short phrases when matched against enrolled text independent biometric models created using either read and/or conversational speech. Additionally, the results were attainable with a mixed speaker/channel base which included standard telephone lines, cellular connections and VoIP phones. The speaker database was expanded to include over 100 native English speakers both male and female. Each of these present unique challenges with filtering background noise, transmission quality, and other speaker-dependent qualities.

Embodiments of One-Time Random Pass Phrase Generation

In various embodiments, grammatically and semantically correct one-time pass phrases are randomly generated on the fly unlike prior art systems that select a pre-stored phrase randomly or randomly select a word or words to supplement pass phrases or pass phrase words previously said by the user.

Pass phrases are randomly generated internally by DPSS on-the-fly from protected language grammar templates and dictionary word sets. It is a goal of the system to rarely, if ever, generate the same challenge pass phrases (one-time) so that even highly sophisticated spoofing attacks are thwarted. As shown in FIG. 1, the DPSS secure intelligent subscription mechanism (1190) is utilized to automatically and securely update the templates (1120) and dictionaries (1130) for pass phrase generation to accomplish this goal.

This methodology expands pass phrase entropy beyond that of other voice biometric systems that are restricted to smaller sets of randomly constructed digits or words that have been stated previously through a text dependent enrollment mechanism. Unlike previous speaker verification methodologies, DPSS verifies the claimed speaker's one-time pass phrase utterance by matching against a registered text independent biometric model. This unique hybrid (different Types of Speech for enrollment versus verification) approach has proven to be effectively accurate though a series of experiments that ultimately demonstrated that it would perform even in a multi-channel environment using established techniques.

Templates

Using embodiments of the present invention, if an impostor has a recording of a valid customer speaking one RPG generated sentence, the chances that said impostor, who deploys sophisticated hacking techniques through audio manipulation, will be able to defraud the system at a later date are low since the RPG program will most often generate sentences which are grammatically different from each other.

DPSS designs implement the n-dimensional scheme using short pass phrases that make sense, are appropriate and simple to say and recognize. This design makes it easy for the user to repeat the phrase back exactly in a hands-free, eyes-free mode. The first implementation of DPSS randomly generates 5-7 word declarative English one-time pass phrases that are grammatically and semantically correct. To generate on-the-fly syntactically and semantically correct pass phrases, RPG uses its own dictionary of words within defined word sets in conjunction with a corresponding pre-defined set of RPG grammar templates as described further later in this document. Methods to tailor and tune phrase generation are performed through template and dictionary updates via a secure subscription capability. These methods are used to insure that phrases are easy to say and make sense for a language or region. RPG grammar templates associated with a language set and dictionaries can further be used to personalize prompted pass phrases for an authorized application or registered user.

Embodiments of the Random Pass Phrase Generator can also be incorporated into other security programs that need a one-time generator. The following describes how the first version of DPSS generates syntactically and semantically correct generic English one-time random pass phrases. RPG uses its own dictionary (RPG Dictionary) of words within defined tailored word sets in conjunction with a corresponding pre-defined set of tailored grammar templates (RPG Grammar Templates database).

The combination of DPSS tailored grammar templates and word sets provides for the flexibility needed to create pass phrases that are easy to repeat, appropriate and in any other way advantageous for randomness and accurate recognition. High security implementations of RPG utilize hidden dictionaries and templates that create pass phrases with high entropy or randomness. Techniques implemented to ensure one-time pass phrase generation utilize continually updated secret templates and word sets to offer n-number of potential pass phrases where n is limited primarily by the number of words in the language.

Entropy or randomness of DPSS pass phrases negates spoofing attacks. Assuming that each template (grammar/word set combination) is unique; the overall number of pass phrases that can be generated by the system is the summation of how many sentences can be generated from each template as described previously for the 68 templates. The probability of a particular one-time pass phrase being generated, given all of the templates resident, is 1 in the total number of sentences which can be generated from all templates. In one embodiment of speech verification processing, a language model is generated for each template and used during pass phrase speech verification processing. Automated routines that are standard in speech recognition are utilized to calculate the number of permutations of pass phrases from each language model associated with a template.

The internal creation of audio pass phrases adds additional security to applications using DPSS authentication. At a minimum, the RPG one-time pass phrase component of DPSS creates as output an internal text version of the one-time pass phrase. This text version can then be securely sent over a network to an external $3^{rd}$ party text-to-speech engine (or otherwise referred to as a synthesized speech engine) to create an audio version of the pass phrase to present the user. Textual output can increase the likelihood of attack through any number of attack vectors; however, in one embodiment of this invention, a secure audio pass phrase is generated internally within the controller which decreases the attack surface. In this case, more sophisticated attack tools and techniques would need to be deployed by an attacker to try to ascertain the DPSS secure audio pass phrase on-the-fly and return a valid response to DPSS. Once the audio challenge pass phrase is generated, secure audio tokens enable additional anti-spoofing techniques further described herein.

The RPG Dictionary data base contains tailored RPG word sets from which words are randomly chosen during one-time pass phrase generation. Each RPG word set in the RPG dictionary is functionally aggregated by a tag singleton whereby each POS+Tag relates to a particular part of speech (POS) and is a functional specification of the words associated with it. The eight general categories of English parts-of-speech (POS) used in the following examples are: nouns, pronouns, prepositions, adjectives, verbs and adverbs. Each RPG Word Set Tag designates a granular tailored representation of one of the standard English POS typically used in sentence constructs.

Sample rows of the RPG Dictionary data base with a few of many tailored word sets are shown below: Each word set tag is associated with a set of words of the same Part of Speech. The words in the word set (see, FIG. 2 at 2030) are similar in the way they are used within the tailored grammar template.

TABLE 1

| RPG Word Set Tag | | | | | | |
|---|---|---|---|---|---|---|
| Ds062208 | many | those | These | all | few | Some |
| D010008 | Each | Every | This | | | |

TABLE 1-continued

| RPG Word Set Tag | | | | | | |
|---|---|---|---|---|---|---|
| N1p011311 | Tourists | Neighbors | Families | Students | Scouts | |
| N1s010008 | Man | Woman | Leader | Groupie | Clown | |
| Vm011311 | Drive | Bicycle | Motor | Ride | Wander | Journey |
| Vs0100008 | Eats | Tastes | Chews | Savors | Relishes | Devours |
| Pd091109 | To | From | Toward | Around | Across | |
| Adj010008 | Hot | Spicy | Warm | | | |
| N4s011311 | Museums | Shops | Villages | Gardens | Parks | Sites |
| N010008 | Spaghetti | Toast | Cheese | Meat | Sandwiches | |

A grammar-based implementation enforces POS agreement. The first version of RPG utilizes a variety of declarative English sentence constructs: noun-verb, preposition-noun, determiner-nominal, pronoun-antecedent, gender, possessive pronoun subject-possessive pronoun object, etc. The RPG design generates semantically correct sentences through refined word sets within the dictionary and the corresponding grammar tags within the pre-defined grammar templates.

This approach can be expanded beyond declarative English sentences for additional types of constructs such as a direct question. The methodology is also applicable to other languages in addition to English.

In an embodiment geared toward semantically accurate pass phrases, the system utilizes a tailored grammar template that goes beyond simple part-of-speech tagging templates such as "[PRONOUN] [VERB aspectual; past] [VERB drink; indefinite] [article-definite] [NOUN drinkable]" to a more robust template format. Referring generally to FIG. 2 for the process flow, the RPG grammar database (in FIG. 2 at 2010; also called OTP Grammar Template in FIG. 1 at 1120) comprises a series of tailored RPG grammar templates. RPG templates form the rule set that governs pass phrase size and construction. Each template is comprised of n number of tailored POS+ Tags. The POS+ Tags are the RPG Words Set Tags which are the specialized part of speech tags described in the above section.

Two examples of the many tailored grammar templates using the tailored word sets previously presented along with a description of each of the Word Set POS+ Tags within the template are shown below:

TABLE 2

| Grammar Template | | | | | | Language Set(s) |
|---|---|---|---|---|---|---|
| 0188 | Ds062208 | N1p0113111 | Vm011311 | Pd091109 | N4s011311 | General |
| 0057 | D010008 | N1s010008 | Vs010008 | Adj010008 | N010008 | General, Food |

Corresponding description of example tailored templates with randomly selected words from each RPG tailored template wordset:

TABLE 3

| Adjective | Noun | | Adverb | Noun |
|---|---|---|---|---|
| Indefinite | plural people | Verb finite s | Place | plural places |
| Ds062208 | N1p0113111 | Vm011311 | Pd091109 | N4s011311 |
| Many | Families | ride | around | gardens |

TABLE 3-continued

| Pronoun | Noun | | Adjective | Noun |
|---|---|---|---|---|
| Demonstr | sing people | Verb finite p | food | food |
| D010008 | N1s010008 | Vs010008 | Adj0100008 | N010008 |
| Every | Clown | Tastes | spicy | cheese |

For instance, Ds062208 identifies a set of words that are to be used as an indefinite adjective in the template 0188. The system then references the RPG Word Set (depicted in Table 1 above).

The RPG pass phrase generation methodology supports that each word in the word set can be further tailored to include more than one word if required for phrase usability. In this case, the one to one mapping to POS is not strictly enforced even though the semantically correct structure is. For example, with a different template, the verb component could be to 'ride' which is actually 2 words in a strict word count assessment.

The RPG design generates semantically correct sentences that sound good and belong to a language set through refined tailored word sets within the dictionary and the corresponding word set or otherwise referred to as POS tags within the tailored pre-defined grammar templates.

DPSS can create a secure audio pass phrase version of the RPG generated one-time pass phrase text using a preferred or otherwise designated Master Audio preference. RPG dictionary words are pre-recorded by a designated voice talent (a voice other than the enrolled user) associated with a master audio preference. There are only a few allowed master voices; the master voice must record the hidden dictionary words. Recordings are administered as a separate, highly controlled security process. A master voice is added to the security system only by an authorized the systems administrator. The audio version is used in the secure DPSS audio token processing to prompt the user to repeat the one-time pass phrase as described herein. Master audio tokens enable branding techniques which are useful against vishing style attacks where impostor organizations claim to be genuine (vishing is the criminal practice of using social engineering over the telephone system, most often using features facilitated by Voice over IP (VoIP), to gain access to private personal and financial information from the public for the purpose of financial reward. See, http://en.wikipedia.org/wiki/Vishing). Master audio tokens are also effective in detecting playback attacks since a 'negative biometric' technique (which does not allow the master voice to pass speaker verification test successfully) can indicate that an attacker has tried to automate the return of the audio token as input to authentication (i.e. not live voice of an authentic or imposter user). Control of the prompting audio enables DPSS to detect playback attempts of the one-time pass phrase master prompted audio through imbedded audio marking and/or a negative biometric matching scheme of the recorded master speaker. DPSS performs its own internal, secure text-to-speech processing using pre-recorded speech of one or more designated voice talents to create the one-time pass phrase 'prompting audio'. By using a voice talent, the system is further insulated against spoofing attacks via an impostor attempting to record and playback the pass phrase.

As shown in FIG. 2, RPG randomly selects an RPG tailored grammar template (2010) associated with the application user's language set and master voice preference (2000). Language set and master voice preferences are pre-established and dictated by policy and profile information. Variable N is set to the number of words in the selected template (2020). For each of the 5 to 7 Word Set Tags in the template (2030), the Generator will randomly select the word or words from the dictionary's corresponding Word Set (2040) and construct a 5-7 word pass phrase (2060) as determined by the template rule set described in the grammar section above.

An embodiment of a high-level flow of the RPG program flow is depicted in FIG. 2. A template is randomly chosen from the Grammar Template data base (2010) which represents the grammatical rules to be used for the phase phrase generation. For each POS token (POS+ Tag) within the template (2030), a word (or set of words) is randomly chosen from the corresponding dictionary word set (2040). Note that n represents the number of POS tokens in the template (2020).

Referring to FIG. 2, this diagram illustrates an embodiment of the one-time pass phrase generation process including the secure pass phrase audio construction option. The DPSS internal audio generator generates the one-time pass phrase secure audio (2070) by concatenating pre-recorded master audio associated with words of the constructed 5-7 word pass phrase (2060) that are stored in the hidden word audio dictionary (1150). The hidden master audio dictionary (1150) contains pre-recorded words of designated individual voice talents associated with the text words in the text dictionary (1130). Prior to pre-recording of one of the few and controlled master voices, the individual voice talent is biometrically enrolled in the DPSS text independent engine and their biometric model (1260) is not allowed to pass verification (used as negative biometric) during verification. Once the one-time pass phrase audio is generated, the DPSS security audio token marker (2080) then imbeds a randomly generated audio watermark in the generated pass phrase audio. The one-time pass phrase text, audio and marker information is stored in the sub-session data (2090) to be used by DPSS. This secure audio pass phrase generation method enables control of the prompting audio that is played by the application for the user to repeat. DPSS control of the prompting audio enables the security system to subsequently detect playback attempts of the prompting audio. In this embodiment, DPSS playback detection during verification includes recognition of imbedded audio marking by the audio analyzer and preparer (1210) and/or biometric recognition (1250) of the master voice considered a negative biometric model (1270) (i.e. one that will not be allowed successful biometric verification). Another embodiment can use the same security concepts of a master voice with a more sophisticated internal synthesized voice engine (imbedded with controller) that uses the pass phrase text as input. This embodiment can also imbed security audio markers and utilize the negative biometric model to check for replay attacks.

Authentication Request and Session Control

In referring to FIG. 1, the security component of an authorized application (1010) requests dynamic pass phrase authentication for a user through the DPSS security controller (1000) which initiates a unique randomly generated authentication session identifier (SID) and establishes a session object (1090) internally to manage the session data. The security controller can be implemented on a computer or configured in an appliance. A session can comprise of the generation and verification of multiple pass phrases depending on the authentication requirements of the application and user. Each new pass phrase challenge is associated with a distinct randomly generated sub-session (SubID) within the session with its own time-out parameter. This is the unique identifier for the one-time pass phrase. Pre-established security policies (1040) and customer application and user preferences determine the rules (1050) under which the session will operate (i.e., number of prompts, language set, audio requirements, etc).

Use

Referring to FIG. 1, a system embodiment of DPSS is shown. A request is received by DPSS (1000) for authentication by the application (1010). The DPSS request manager (1060) handles the request and a session is initiated (1080) to manage one or more pass phrase challenge responses if the requesting customer application is authentic (1020). The DPSS security controller (1000) and request manager (1060) check that the user exists and that the required user profiles (11070) and security policies (1040) are known. A sub-session is created by the session manager (1080) to manage one challenge/response round trip associated with the generated one-time pass phrase. The one-time audio pass phrase generator (1100) requests RPG (1110) to generate an internal text one-time pass phrase using the techniques specified in the previous section. The one-time audio pass phrase generator (1100) requests the audio generator (1140) to create a secure audio pass phrase. DPSS creates a corresponding Prompt Audio Token (PAT) to be referenced by the application to prompt the user to repeat the pass phrase. The 'prompting audio' is a secure audio form of the text version of the one-time pass phrase generated internally by DPSS. The secure pass phrase audio generated is relayed to the authorized application in a secure Prompt Audio Token (PAT) which contains other security and control information The authorized application that receives and validates the PAT can simply 'play' the DPSS secure pass phrase audio when it prompts the user to repeat the pass phrase.

Further referring to FIG. 1, once an authorized application (1010) receives the PAT, it prompts the user by playing the 'prompting audio' and collects the end user's response audio (pass phrase utterance by the user), it creates a corresponding Response Audio Token (RAT) and requests dynamic pass phrase verification (1200). DPSS (1000) receives the RAT, performs session security checks and proceeds with audio analysis (1210) to insure the integrity of the returned audio. The rules that govern the audio analysis processes and decisions (1210) are pre-determined from the configuration (1070) and security policies (1040). This approach supports various audio formats including recorded audio or agreed upon speech features from a secure DPSS client plug-in (1010). Audio analysis and preparation (1210) includes a quality assessment (amount of speech, signal to noise ratio, etc.), end pointing, detection of the DPSS random audio marker and other hacking detections. The audio analysis function (1210) allows for new and additional audio analysis capabilities in the future as conditions change.

If the pass phrase response audio integrity is acceptable and adequately prepared, DPSS proceeds with verification of the response audio. Further referring to FIG. 1, user voice authentication stipulates simultaneous speech recognition (1220) (speech verification of the sub-session audio) and speaker recognition (1250) (speaker verification of sub-session and cumulative session audio of all pass phrase responses during that session). For each unique pass phrase generated during the session, speech recognition methods must verify that the pass phrase spoken by the user (response audio) matches the randomly generated one-time pass phrase. Simultaneously, text independent speaker recognition methods must verify that the pass phrases (cumulative response audio within the session) spoken by the user match their biometric model (or models if using multiple biometric engines or methodologies).

Figure 4:
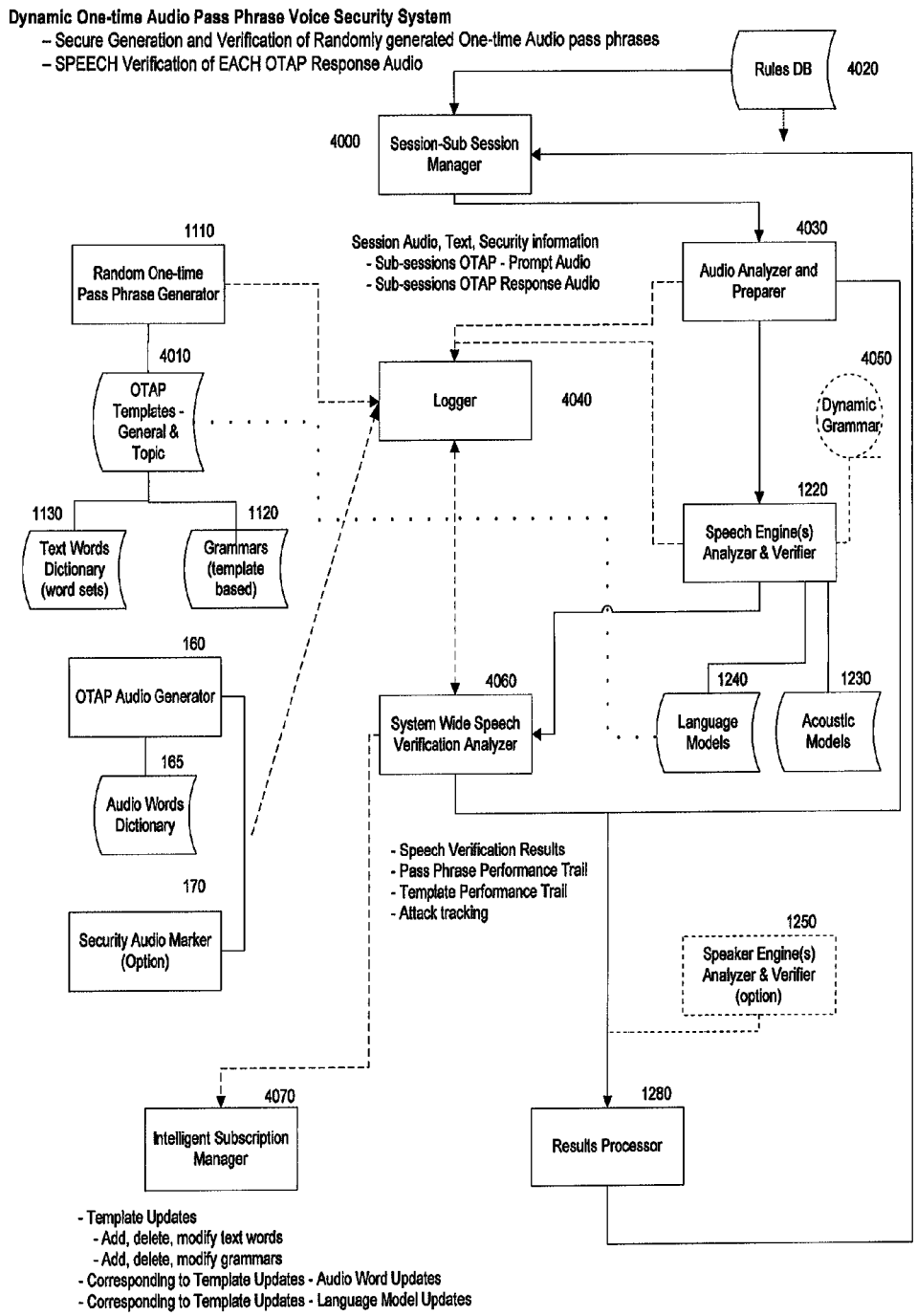
FIG. 4 is an architectural example of a Dynamic One-Time Audio Pass Phrase Voice Security System.

Referring to FIG. 4, this diagram focuses on the speech verification aspect of the one-time pass phrase generation and audio token. Since the one-time pass phrase is 'known' internally to DPSS once it is randomly generated, speech verification (1220) of the known phrase can be accomplished with high certainty using methods available today. DPSS can use a speech recognition engine with a dynamic grammar of the 'known' phrase if the engine supports dynamic grammars (4050). Alternately, DPSS can use system generated language models if the engine supports the tools to generate language models. In an embodiment, DPSS uses the CMU Sphinx speech recognition engine in its end-to-end experiments, which supports generated language models. DPSS Language models (115) are pre-created per template (4010) from grammar templates (1120) and associated dictionary word sets (1130). A particular language model (1240) is used for speech verification if that template is randomly selected by RPG (1110) to be used to generate the sub-session one-time pass phrase.

In this embodiment, DPSS securely performs speech verification (1220) using a combination of unconstrained and constrained speech recognition. If the audio requires front end processing and feature extraction because it has not been already performed by an external component, it is performed by DPSS prior to performing direct speech recognition and a forced-alignment mode of speech recognition. Unconstrained or direct speech recognition converts the input speech signal into text. It does so by using a set of trained acoustic models (1230) and language model (1240) as described in detail in the Rutgers Paper. Direct speech recognition derives a likelihood score based on the probability that the words were uttered. Constrained or forced alignment uses a transcription of the input speech and determines how good the speech input aligns to the corresponding transcription and derives an acoustic likelihood score which is high if the transcription matches the input speech. Speech verification (1220) compares the unconstrained and constrained results to provide a verification result.

Further referring to FIG. 4, the logger (4040) retains information about results across DPSS. Logged results (4040) are used by DPSS monitoring so that it can assess (4060) difficult or otherwise poor performing (speech verification) phrase structures (1120) or words (1130) and subsequently update templates used by RPG (4010) via the intelligent subscription manager (4070). Logged results (4040) are also used by DPSS monitoring so that it can track and assess potential attacks (4060) such as playback attacks.

Referring back to FIG. 1, DPSS securely performs text independent speaker verification (1250) on the audio responses associated with the short phrases that are maintained by the session object. If the audio requires front end processing and feature extraction it is performed prior to speaker verification matching. DPSS compares the features with the speaker model(s) for the user and background models and determines the results. Text independent methods and experiments employed are detailed in the referenced paper.

Referring to FIG. 1, once simultaneous speech and speaker verification is performed, the results are processed (1280) according to the configuration (1070) and policies (1040) established for the application and user. For the short phrases design, two pass phrases are typically required so that enough audio is available to perform text independent biometric matching with the prescribed accuracy. Internally, results are used to continue to the next pass phrase generation based on rules (1050) governing the session. The DPSS controller (1000) typically reports back to the application (1010) and user after the last prompt at the end of the authentication session as per the pre-established rules (1050) governing the session.

Referring to FIG. 3, this diagram focuses on the speaker verification aspect of the one-time pass phrase generation and audio token. It includes the DPSS logging support (3040) which enables security monitoring and provides information to assist in the continual improvement of pass phrases generated and speech recognition performed. The session manager (3000) collects internally the audio responses from one or more one-time pass phrases. The concatenated stored sub-session audio responses for the active session are the input to the text independent speaker verification engine (1250).

In an embodiment, text independent performance using audio from two or more short pass phrases may be implemented. The secure session (3000) capabilities of DPSS collect the sub-session pass phrase response audio from 1 to z pass phrase responses where z is preferably 2 for a session. The number of times that a one-time pass phrase is generated during a session is configurable by an authorized administrator for an application that utilizes DPSS authentication. Configuration is based on authorized application security requirements reflected in DPSS security profiles and associated rules (3010).

Further referring to FIG. 3, the logger (3040) retains information about verification results across DPSS. Logged results (3040) are used by DPSS monitoring so that it can assess (3050) poor performing (speaker verification) phrase structures or words and subsequently update templates used by RPG (1110). Logged results (3040) are also used by DPSS monitoring so that it can track and assess potential attacks (3050) such as biometric attacks by impostors.

Enrollment

Preferably, embodiments of user enrollment interfaces are easy and/or seamless including user's interactions with an authorized customer application provider. Authorized customer applications can be a variety of multi-modal applications where voice is present as an input option. For example, by pulling speech samples in the background of live interactions of an authenticated end user (via other pre-established methods of authentication) with a call center agent and/or scripts, the enrollment process can gather a lot of speech without necessarily forcing the end user to go through a separate enrollment process. The collected speech is utilized to create a text independent biometric model registered to the end user. A second example is to capture speech for enrollment in the background of a mobile or smart phone conversation through a designated device of an otherwise authenticated user. During verification, the speech collected and processed from two prompted randomly generated one-time pass phrases (e.g., 5-7 words) are shown to have a high degree of authentication accuracy when matched to the enrolled biometric model in text independent model mode. See, Rutgers Paper as one embodiment supporting performance claim. One test run that demonstrates the performance numbers claimed is shown in the table below from the 2012 Speaker Verification Paper. The following table shows mean and median equal-error rates for landline telephone recordings and read speech training as a function of speaker gender, the number of phrases per test utterance and the duration of the training speech.

| NO. OF PHRASES PER TEST UTTERANCE | TRAINING DURATION | | | | | | | |
|---|---|---|---|---|---|---|---|---|
| | 4 MINS. | | 3 MINS. | | 2 MINS. | | 1 MIN. | |
| | M | F | M | F | M | F | M | F |
| 1 | 3.09 | 3.71 | 3.19 | 3.85 | 3.38 | 4.23 | 4.79 | 5.24 |
|   | 2.24 | 2.64 | 2.59 | 2.59 | 2.67 | 2.78 | 3.92 | 4.12 |
| 2 | 1.38 | 1.33 | 1.55 | 1.41 | 1.68 | 1.89 | 2.71 | 2.39 |
|   | 0.13 | 0.60 | 0.17 | 0.69 | 0.17 | 0..99 | 1.81 | 1.47 |
| 3 | 1.01 | 0.67 | 1.26 | 0.72 | 1.14 | 0.93 | 1.88 | 1.40 |
|   | 0.09 | 0.13 | 0.09 | 0.13 | 0.09 | 0.26 | 0.30 | 0.39 |

The average (top) and median (bottom) Equal Error Rates (EERs) over 20 speakers for landline telephone recordings, read speech training, as a function of gender, training duration and number of phrases per test utterance.

Figure 8:
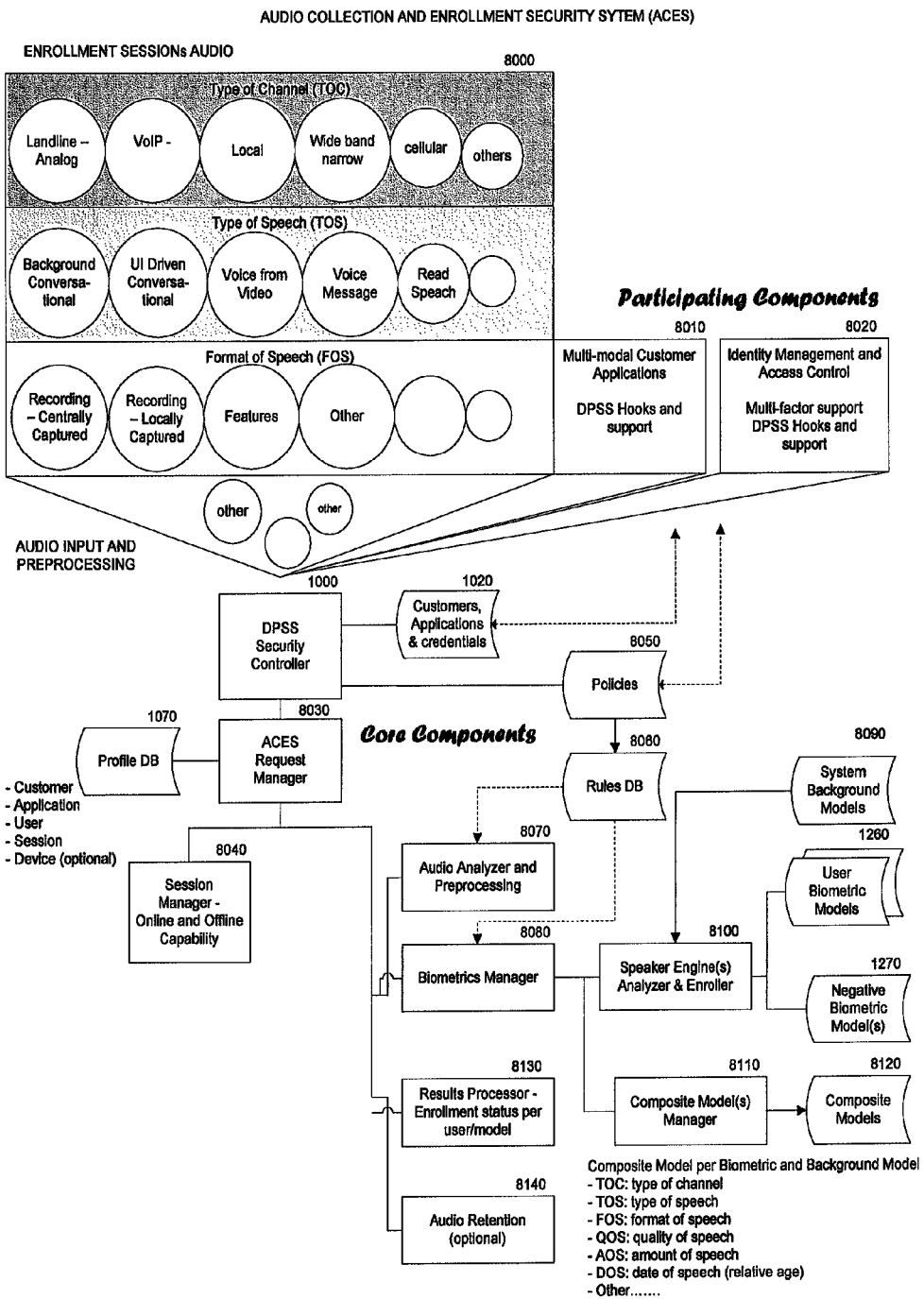
FIG. 8 illustrates a schematic view of an n-dimensional high assurance biometric enrollment process incorporating risk-based training/enrollment and the Biometric Composite Model (BCM) for immediate visibility and control of every biometric model.

In FIG. 8, an example of enrollment is provided. Legitimate users provide speech data for training their voice biometric models. The Type of Speech (TOS) enrollment data may be read or conversational speech. This "training" speech is captured using an acquisition device such as a digital microphone in a land line telephone, Cellular Telephone or a VoIP Phone. In this embodiment, the captured speech is recorded and the speech is processed. A unique automation method to capture, record, and process this enrollment data across channels and sessions is an embodiment of this invention. Representative speech features are obtained from the recordings. Any text independent speaker recognition enrollment and subsequent verification methodology can be utilized by the Audio Collection and Enrollment System (ACES). This approach fosters state-of-the-art utilization. Speaker recognition methods are specified in the system engine configurations and enforced via rules (125).

Embodiments may be designed using a variety of text independent speaker recognition techniques whether already established or developed in the future. Modern speaker recognition systems utilize a set of background or cohort speakers in some formation for optimized robustness and efficiency in computational requirements. In the specific Rutgers experiments referenced as one means to support speaker recognition for the Dynamic Pass phrase voice security system, a Universal background model from which a true speaker model is adapted (Reynolds et al, 2000) is utilized. Other methods may use a discriminative model (Campbell et al. 2006). Background speakers are used to normalize the speaker match scores via various methods in the domain of speaker verification science (Furui, 1997, Higgins et al. 1991, Li and Porter, 1988, Reynolds, 1995, Reynolds et al. 2000, Sivakumaran et al. 2003). The system can also supports various ways to categorize the voice features representative of the user such as short-term spectral features, voice source features, spectral-temporal features, prosodic features and high-level features. For additional background information on text independent techniques, see, "An overview of text-independent speaker recognition: From features to supervectors", 2009 Elsevier B. V.

In the Rutgers experiments referenced that represent one text independent embodiment of speaker recognition, Mel Frequency Cepstral Coefficients and their time derivatives are used to represent the speech in the system. These features are then used to create the individual speaker models for the customers. In the experiments, along with the individual customer models, the features are also used to form a Universal Background Model (UBM) which contains the speech features from a collection of other speakers (excluding the customer). These customer models use statistical models called Gaussian Mixture Models (GMMs) which is a statistical model of the spectral properties of the customers voice. The UBM is also represented by a GMM constructed using the training speech from a large number of speakers. Background training speech data may be captured, recorded and processed across channels and sessions to calibrate the models.

Previous text dependent style enrollment systems require the user to speak a phrase several times, or build a dictionary of spoken words that are used in random order during verification (e.g., Higgins). Such systems require the user to have said a word during enrollment which opens the system up to learning attacks which have retained and monitored previous sessions. Some of these text dependent style systems can adapt or train across sessions but are restricted to the pass phrase or several pass phrases. The DPSS text independent n-dimensional system utilizes one-time phase phrases which are unique each time and do not require a previous word to have been stated. Preferably, the system will have adequate amounts of training speech (i.e., 20 to 60 seconds or more). Full enrollment may be based on 4 minutes of speech data. Examples of enrollment speech are conversational (for example, conversation with a call center agent, conversation with a natural language IVR, voice mail message, audio from video chat, conversation from a collaborative meeting, conversation from a designated personal device, etc.) and read speech (which tends to be tied more to a document).

Previous text independent enrollments have been collected on one system and verified on the same system with the same Type of Speech (TOS). These systems collect large amounts of speech to enroll and large amounts of speech to verify. In these systems, both enrollment and verification use the same integration hook embedded in one system, one session at a time. This is unlike DPSS which uniquely combines one type of speech during enrollment (read or conversational) and another type of speech (pass phrase) during verification.

Continuing to refer to FIG. 8, DPSS facilitates voice biometric training over the life time of users even as factors change such as the systems and/or devices with high integrity and assurance. Identity management systems (8020) ensure speech training data is authentic and processed in accordance to prescribed security and privacy policies. DPSS Composite models Manager (8110) manages the Meta data that comprises the text independent biometric models and creates a Biometric Composite Model (8120) per user Biometric Model (1260).

In referring to FIG. 8, DPSS identity based enrollment support (8020) which incorporates multi-factor authentication and risk based enrollment assures that the user is authentic with a prescribed assurance prior to allowing their biometric model to be adapted with additional training data. A high risk application requires stringent multi-factor authentication prior to training updates and that the training itself adhere to stringent policies. A low risk application may require less stringent multi-factor authentication prior to training updates and the training itself adhere to less stringent policies. Policies are enforced across the authorized customer application (8010) and the DPSS enrollment system (1000). DPSS security and privacy policies (8050) not only dictate training updates but stipulate when the biometric model is adequately trained and the user is deemed successfully enrolled. The successfully enrolled biometric can then be used for DPSS verification with integrity as per the customer application policies based on risk assessments.

Continuing to refer to FIG. 8, the DPSS Biometric Composite Model (BCM) (8110) is a model used for Biometric Assurance (BA) enabling visibility and control of the biometric calibration and enrollment (8100) processes. The DPSS Biometric Composite Model or BCM (8110) brings together information associated with the biometric data and configuration used to create a biometric model (1260) (i.e. there is one BCM per Biometric model). In the realm of voice biometrics, the combination dictates how a voice verification system performs. Biometric Assurance (BA) enables management with high integrity of: multiple training sessions comprised of various types of speech over the biometric lifecycle, calibration and enrollment across biometric systems, channels and devices, multiple biometric verification methodologies and/or engines.

Biometrics assurance using BCMs is applicable to text-independent as well as text-dependent biometric systems but is especially crucial for DPSS which trains across multiple sessions, systems, devices and channels according to risk based security and privacy policies. DPSS supports multiple biometric-BCM models per user where by each model pair adheres to specific security and privacy policies. One simplified example is that a high risk customer application with strict policies may stipulate that a biometric model is considered successfully enrolled for that application only after training has occurred with 4 minutes of high quality speech. This information along with other important statistical information about the user's biometric model is maintained within the BCM for immediate management and use of the biometric with high integrity. A second lower risk customer application with less stringent policies may stipulate that a biometric model is considered successfully enrolled with 2 minutes of adequate quality audio. Again, this information would be evident immediately from the BCM for both DPSS enrollment and verification purposes. The 2012 Rutgers Speaker Verification Report shows a series of verification performance numbers for voice biometric models constructed from different types of voice data from the various channels and sessions as well as variations in the amount of speech used to train the model for enrollment and various numbers of phrases used for verification. For biometric assurance purposes, the BCM provides the transparency security managers require for a speaker biometric system that utilizes different types of voice data across biometric enrollment sessions and enrolls a wide variety of users.

Previous enrollment systems reside on one system with one designated mode (e.g. numeric combination or one password or just speaking to a call center agent). This creates voice biometric authentication silos as users enroll in more and more distinct voice biometric systems. Inevitably, users lose control of their voice biometric. This previous approach makes it difficult for organizations to manage voice identities or easily understand what each user's voice biometric comprises of. DPSS identity based enrollment and text independent biometric models combined with composite models facilitates a universal approach to voice biometric identity with high integrity.

Implementation

Referring to FIG. 8, in addition to a localized and/or single device configuration, DPSS training requests from authorized customer applications for voice biometric enrollment purposes can be performed from multiple different systems that support various types of devices and channels (8000). Customer applications (8010) that use the appropriate level of identity management and multi-factor authentication capabilities (8020) can reliably collect audio to be used for enrollment. DPSS provides the authorized application plug-in 'hooks' and support to facilitate the secure collection of user speech. The application 'hooks' and DPSS support also facilitates the secure collection of pertinent profile information associated with the training speech collected such as user device and channels of communications utilized and/or user information such as gender and age. DPSS provides a text independent secure enrollment service (8100) which uses the collected audio (8000), identity (8020) and profile (1070) information and policies (8050) as input to training the user's biometric model(s).

ACES enrollment management systems allows for and facilitates the creation and utilization of multiple biometrics models per user. ACES enrollment management system provides transparency and facilitates optimal performance and usability of a text independent speaker recognition system. One use of multiple biometric models per user (1260) could be to allow for the temporary use of a biometric model created from a less than optimal amount, type or other aspect of speech. A second and more complete biometric model could be created in an off-line manner over a period of time that is required to process more speech. For example, there could be a highly computational overnight process that uses all training data to fully enroll the user and perform quality testing according to the enrollment policies prior to the user being voice verified and then able to access certain data and/or be authorized to perform designated transactions. A second use of multiple biometric models per user could be to allow for multiple speaker recognition enrollment methodologies which are according to the established speaker recognition engine configuration and rules. During verification the system could perform dual matches using each engine configuration and then combine the overall results according to pre-established matching rules.

In any configuration, DPSS training requests from authorized customer applications for voice biometric enrollment purposes can be performed across multiple sessions with integrity throughout the biometric lifecycle of the end user.

Dynamic pass phrase verification stipulates that a registered user of an authorized application must repeat each randomly generated one-time audio pass phrase exactly and that their biometric for the session must match their generic text independent biometric model on file. A second configuration option exists for non-registered users without a biometric where a customer application only needs liveness authentication without identification.

Calibration

The ACES Calibration management function automates the audio collection, build and tuning of a speaker recognition engine with high integrity and transparency over the life time of a voice biometric system. Embodiments including ACES calibration provide an optimal level of voice biometric performance while maintaining a high degree of integrity and transparency even as user sets, channels and devices change over time.

ACES Calibration which works in conjunction with ACES Enrollment is primarily geared towards text independent speaker recognition which requires a lot of speech data and processing power as compared to text dependent systems. ACES positions speaker verification technology to make use of Cloud computing, or otherwise known as, large hosted computing resources. ACES Calibration in the Cloud as performed in this invention makes possible the use of voice biometrics beyond niche oriented targeted deployments of the past to a more widely accessible authentication security technology.

Figure 9:
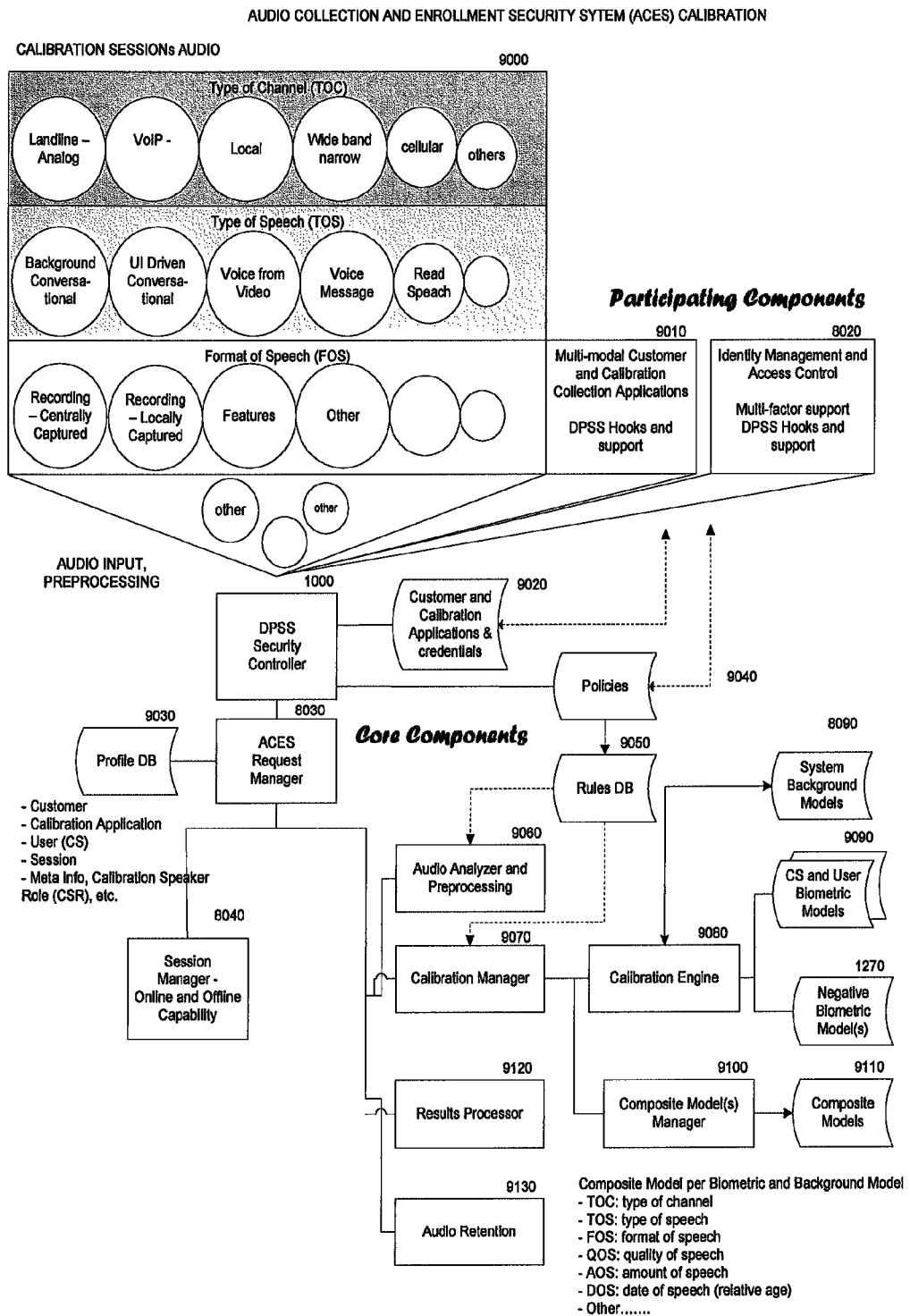
FIG. 9 illustrates a schematic view of an embodiment depicting calibration of the system.

In FIG. 9, during the calibration phase, a control set of end users, termed Calibration Speakers (CS), provide speech data for training the systems background model(s), true or authentic speaker biometrics models and imposter test data. The calibration "training" speech is captured similar to the ACES Enrollment using an acquisition device such as a digital microphone in a land line telephone, Cellular Telephone or a VoIP Phone. The collected calibration speech data (9000) is used to build and/or test and tune the speaker verification engine(s) according to the pre-established calibration rules (9050). Any valid text independent speaker recognition methodology can be deployed by ACES audio collection and rule based calibration. This approach fosters state-of-the-art utilization. Speaker recognition methods are specified in the system engine configurations and enforced via rules (9050).

ACES Calibration is a multi-step, transparent process that utilizes a control set of users as a means to automatically build and continually improve the performance of a text independent ACES voice biometric system. Improvements can due to a number of factors including the addition or improvement of audio data that comprises the voice biometric engine and/or new techniques/algorithms to build the biometric engine as dictated by the configuration and directed by the calibration rule set.

In an embodiment utilizing ACES calibration, prior to collection of calibration data, devise a desired set of Calibration end user Speakers (CSs), channels and devices to participate in the calibration of the ACES system either as the initial CSs or as additional CSs as the system expands. The set of CSs should include the prescribed representation of males and females as well as other considerations to ensure a representative sample of the population. Vet CSs and ensure agreements to co-operate and be monitored etc. are in place as required by policies often dictated by privacy laws. Assign CS ID numbers and collect pertinent Meta information such as gender and age. Assign a Calibration end user Speaker Role (CSR) to each CS. Roles include Background Model Speaker, True Speaker, Imposter and/or other. Calibration Speakers and their profile information is loaded in the profile database (9030).

ACES calibration collection applications are structured applications that run in the system environment that is representative of the deployment environment in which speaker recognition enrollment and verification are performed. Calibration training applications typically mock a real enrollment application but are simpler with the goal of collecting background and training audio data. If pre-processing of the audio is required as it is in enrollment, then calibration can use the same pre-processing and/or audio segmentation for multiple party conversations. Calibration true speaker and imposter test applications typically mock a verification application but tend to collect more test utterances that can be used for verification performance testing as part of the calibration, test and tuning processes.

Audio data and the associated user and computing environment Meta data is collected, stored and indexed as a result of the calibration collection applications. The Meta data is important input information for building the engine properly and is incorporated in the background and biometric composite models. Meta data descriptive of the unstructured data audio and/or related data is maintained and used for improved knowledge and management of the audio that comprises the system construction.

The ACES Calibration process includes the same audio pre-processing and feature extraction processes as the ACES enrollment program. Again similar to the ACES enrollment function, the feature extraction can be performed in a distributed fashion or at the central site on the raw audio data.

Using the audio collected (9000) from Calibration Speakers (CSs) designated with the role of background model speaker, the ACES Calibration process creates the Background Model(s) (8090) according to the biometrics configuration and rules established and an associated Composite Model (9110). For management, transparency and assurance purposes, ACES calibration creates a composite model similar to the biometric composite model performed by ACES enrollment which represents at a glance the Meta data summary information (number of males/females, amount of speech, quality of speech, type of speech, type of channel, etc.). The Background composite model is a succinct descriptor of the composition of the population and voice biometric system characteristics.

In an embodiment, automated text independent Test and Tune comprises of the following processes:

Create Enrollment Models from the calibration audio for calibration speakers (CSs) who are designated as true speakers and store in the biometric models database.

Perform Impostor and true speaker (if available or can create from speech input during enrollment) tests and obtain scores.

Perform and plot a priori tests (EER) assuming available data (true speaker phrases) for reporting and performance tracking.

Create Thresholds for true speaker.

Perform a posteriori performance tests, adjust threshold if needed according to results and pre-established tuning rules.

Analyze biometrics models of existing customers (if their enrollment audio was saved) by running performance tests with new background model and/or updated biometric configuration and associated rules.

Deploy new enrollment, run tests and deploy if comparable, better or other anticipatory reason would want a better Background Model.

Archive and/or delete previous biometrics models according to security and privacy rules at designated point and time.

Further variations could also be practiced by those of ordinary skill in the art without undue experimentation. Thus, the disclosure set forth herein should be understood as illustrative only, and not limiting.

The invention claimed is:

1. A computerized authentication method of creating one-time audio challenge-response tokens and verifying user voice identity, the method comprising:
   a. providing a database of a plurality of customers, a set of applications associated with each customer, and a security profile
      i. wherein said security profile is specified for each customer and application; and
   b. providing a database of a plurality of users, where each user is associated with
      i. one or more of said set of applications, and
      ii. a profile comprising a set of preferences and identification data; and c. providing a database of text-independent speaker verification biometric models, associated with each user, for the purpose of voice biometric verification wherein each of said biometric models has a corresponding biometric composite model;
d. providing a database of speech recognition language and acoustic models for the purpose of audio response speech verification;
e. providing a database of grammar templates wherein each grammar template has 5 to 7 word set tags, wherein the words, within a given word set tag, are within the same part of speech;
f. providing a text word dictionary comprising a plurality of word set tags each associated with a number of words;
g. providing a database of master audio for the purpose of prompt audio pass phrase generation;
h. selecting, in response to an authentication request for a given customer application and a given user, a customer profile and a user profile based on a set of identification information received in said authentication request;
i. authenticating said given customer application is authorized;
j. verifying said given user exists in the database of a plurality of users;
k. verifying said given user is active;
l. verifying that at least one biometric model and its composite model indicate a status of enrolled;
m. establishing an internal authentication session object for session control and sub-session management;
n. establishing an internal sub-session associated with a single challenge-response relay;
o. generating, in text form, a random pass phrase from a grammar template, within said database of grammar templates, and said text word dictionary;
p. generating, in audio form, said random pass phrase from master audio data base;
q. creating a prompt audio token with a unique sub-session ID;
r. initiating an internal sub-session response time timer;
s. storing said prompt audio token with said text and audio version of said random pass phrase in a sub-session object;
t. sending said prompt audio token to said customer application via a communications system;
u. playing said random pass phrase and prompting said given user to repeat said random pass phrase exactly via said communications system;
v. collecting a user response audio;
w. using said user response audio, creating a response audio token with said unique sub-session ID, sending said response audio token to a security controller via said communications system, said security controller receiving said response audio token, stopping said sub-session response time timer, storing said audio response in said session object;
x. verifying said response audio token integrity;
y. verifying said sub-session response time timer is less than a timeout parameter;
z. verifying if a set of extracted speech recognition features are representative of the random pass phrase using said speech recognition language and acoustic models;
aa. setting a sub-session word match flag on and updating a session word match count if speech verification is positive;
bb. setting a minimum number of phrases flag on if the session word match count is equal to or higher than a session word match parameter;
cc. establishing a new sub-session and repeating steps m-cc, a challenge-response relay, until the minimum number of phrases flag is on or a maximum number of challenge-response relays parameter is reached and an authentication session is aborted;
dd. concatenating said user response audio from all sub-sessions with word match flag on if the minimum number of phrases flag is on into a concatenated audio;
ee. matching a set of extracted speaker recognition features of said concatenated audio to a registered speaker biometric model of a registered user;
ff. setting a biometric match flag on if step "ee" is positive; setting a session authentication flag to positive if the minimum number of phrases flag is on and the biometric match flag is on; and
gg. sending an authentication passed result to said given customer application if said session authentication flag is positive, sending authentication failed result to said given customer application if said session authentication flag is false.

2. The method of claim 1, further wherein said random pass phrase is generated from a set of tailored templates.

* * * * *